US010862966B2

(12) United States Patent
Rao et al.

(10) Patent No.: US 10,862,966 B2
(45) Date of Patent: *Dec. 8, 2020

(54) STORAGE AREA NETWORK ATTACHED CLUSTERED STORAGE SYSTEM

(71) Applicant: NetApp Inc., Sunnyvale, CA (US)

(72) Inventors: Santosh Ananth Rao, Santa Clara, CA (US); Geoffrey Stewart Brown, Raleigh, NC (US); Srikumar Natarajan, Sunnyvale, CA (US); Pranab Patnaik, Cary, NC (US); Kai Tan, Cary, NC (US); Peter Frank Corbett, Lexington, MA (US); Vivek Venkatesan, Morrisville, NC (US)

(73) Assignee: NetApp Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,794

(22) Filed: Nov. 13, 2018

(65) Prior Publication Data

US 2019/0082013 A1 Mar. 14, 2019

Related U.S. Application Data

(63) Continuation of application No. 14/918,033, filed on Oct. 20, 2015, now abandoned, which is a (Continued)

(51) Int. Cl.
*H04L 29/08* (2006.01)
*H04L 12/26* (2006.01)
*G06F 13/22* (2006.01)

(52) U.S. Cl.
CPC .... *H04L 67/1097* (2013.01); *H04L 29/08549* (2013.01); *H04L 43/10* (2013.01); *G06F 13/22* (2013.01)

(58) Field of Classification Search
None
See application file for complete search history.

(56) References Cited

U.S. PATENT DOCUMENTS 5,748,958 A 5/1998 Badovinatz et al.
6,452,689 B1 9/2002 Srinivasan
(Continued)

OTHER PUBLICATIONS

International Preliminary Report on Patentability for Application No. PCT/US2012/054927 dated Mar. 25, 2014, 6 pages.
(Continued)

*Primary Examiner* — Dhairya A Patel
(74) *Attorney, Agent, or Firm* — Cooper Legal Group, LLC

(57) ABSTRACT

A storage area network (SAN)-attached storage system architecture is disclosed. The storage system provides strongly consistent distributed storage communication protocol semantics, such as SCSI target semantics. The system includes a mechanism for presenting a single distributed logical unit, comprising one or more logical sub-units, as a single logical unit of storage to a host system by associating each of the logical sub-units that make up the single distributed logical unit with a single host visible identifier that corresponds to the single distributed logical unit. The system further includes mechanisms to maintain consistent context information for each of the logical sub-units such that the logical sub-units are not visible to a host system as separate entities from the single distributed logical unit.

14 Claims, 19 Drawing Sheets

Related U.S. Application Data continuation of application No. 13/359,203, filed on Jan. 26, 2012, now Pat. No. 9,203,900.

(60) Provisional application No. 61/538,786, filed on Sep. 23, 2011.

(56) References Cited

U.S. PATENT DOCUMENTS

| | | | |
|---|---|---|---|
| 6,535,119 | B1 | 3/2003 | Haulk et al. |
| 6,567,937 | B1 | 5/2003 | Flores et al. |
| 7,451,152 | B2 | 11/2008 | Kraft et al. |
| 8,332,497 | B1 * | 12/2012 | Gladish ............... G06F 16/2308 709/223 |
| 8,346,735 | B1 * | 1/2013 | Tang ................... G06F 11/1474 707/675 |
| 8,683,170 | B1 | 3/2014 | Patnaik et al. |
| 8,700,585 | B2 * | 4/2014 | Vaghani .............. G06F 16/1767 707/704 |
| 8,793,432 | B2 | 7/2014 | Patnaik et al. |
| 9,003,138 | B1 * | 4/2015 | Natanzon ................... G06F 9/46 711/162 |
| 2002/0006114 | A1 | 1/2002 | Bjelland et al. |
| 2003/0110221 | A1 | 6/2003 | Berkowitz et al. |
| 2004/0064633 | A1 | 4/2004 | Oota |
| 2004/0128587 | A1 | 7/2004 | Kenchammana-Hosekote et al. |
| 2004/0205377 | A1 | 10/2004 | Nakamura et al. |
| 2005/0055501 | A1 | 3/2005 | Guha et al. |
| 2005/0120160 | A1 | 6/2005 | Plouffe et al. |
| 2005/0172179 | A1 * | 8/2005 | Brandenberger ... G06F 11/1012 714/718 |
| 2005/0192932 | A1 * | 9/2005 | Kazar ..................... G06F 16/10 |
| 2005/0203998 | A1 | 9/2005 | Kinnunen et al. |
| 2005/0283644 | A1 | 12/2005 | Lorch et al. |
| 2006/0024807 | A1 | 2/2006 | Bird et al. |
| 2006/0041778 | A1 | 2/2006 | Lizzi et al. |
| 2006/0095705 | A1 | 5/2006 | Wichelman et al. |
| 2006/0100981 | A1 * | 5/2006 | Jones ...................... H04L 12/12 |
| 2006/0136781 | A1 | 6/2006 | Lamport |
| 2006/0168011 | A1 | 7/2006 | Lamport |
| 2006/0182050 | A1 * | 8/2006 | Dohm .................. G06F 11/2056 370/312 |
| 2006/0248047 | A1 | 11/2006 | Grier et al. |
| 2007/0079060 | A1 | 4/2007 | Burkey et al. |
| 2007/0214355 | A1 | 9/2007 | Lamport |
| 2007/0234115 | A1 | 10/2007 | Saika |
| 2007/0239944 | A1 | 10/2007 | Rupanagunta et al. |
| 2007/0255813 | A1 * | 11/2007 | Hoover .................. G06F 9/5061 709/223 |
| 2008/0243933 | A1 * | 10/2008 | Holtzman ............. G06Q 10/06 |
| 2008/0320097 | A1 | 12/2008 | Sawicki et al. |
| 2009/0040926 | A1 | 2/2009 | Li et al. |
| 2009/0119666 | A1 | 5/2009 | McKean et al. |
| 2009/0144720 | A1 * | 6/2009 | Roush ....................... G06F 8/65 717/171 |
| 2009/0172142 | A1 | 7/2009 | Hanai et al. |
| 2009/0287825 | A1 | 11/2009 | Walker et al. |
| 2010/0011245 | A1 | 1/2010 | Talaugon et al. |
| 2010/0017495 | A1 * | 1/2010 | Lamport ................ H04L 63/123 709/206 |
| 2010/0185847 | A1 | 7/2010 | Shasha et al. |
| 2010/0228915 | A1 | 9/2010 | Ogihara et al. |
| 2011/0025371 | A1 | 2/2011 | Simon |
| 2011/0072228 | A1 | 3/2011 | Nagata et al. |
| 2011/0185141 | A1 | 7/2011 | Dhuse et al. |
| 2012/0271795 | A1 | 10/2012 | Rao et al. |
| 2012/0278568 | A1 | 11/2012 | Broido et al. |
| 2013/0080559 | A1 | 3/2013 | Rao et al. |
| 2014/0149536 | A1 | 5/2014 | Patnaik et al. |
| 2014/0281065 | A1 | 9/2014 | Patnaik et al. |

OTHER PUBLICATIONS

International Search Report for Application No. PCT/US2012/054927 dated Feb. 27, 2013, 4 pages.

Supplementary European Search Report for Application No. EP12833123 dated Dec. 23, 2014, 7 pages.

Written Opinion for Application No. PCT/US2012/054927 dated Feb. 27, 2013, 5 pages.

\* cited by examiner

STORAGE AREA NETWORK ATTACHED CLUSTERED STORAGE SYSTEM

RELATED APPLICATION

This application claims priority to and is a continuation of U.S. patent application Ser. No. 14/918,033, filed on Oct. 20, 2015 and titled "STORAGE AREA NETWORK ATTACHED CLUSTERED STORAGE SYSTEM," which claims priority to and is a continuation of U.S. Pat. No. 9,203,900, filed Jan. 26, 2012 and titled "STORAGE AREA NETWORK ATTACHED CLUSTERED STORAGE SYSTEM," which claims priority to U.S. Provisional Patent Application 61/538,786, filed on Sep. 23, 2011 and titled "STORAGE AREA NETWORK ATTACHED CLUSTERED STORAGE SYSTEM," all of which are incorporated herein by reference.

FIELD OF THE INVENTION

At least one embodiment of the present invention pertains to network storage systems, and more particularly, to a Storage Area Network (SAN)-attached clustered storage system.

BACKGROUND

A storage controller is a physical processing device that is used to store and retrieve data on behalf of one or more hosts. A network storage controller can be configured (e.g., by hardware, software, firmware, or any combination thereof) to operate as a storage server that serves one or more clients on a network, to store and manage data in a set of mass storage devices, such as magnetic or optical storage-based disks, tapes, or flash memory. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Storage servers in a SAN environment organize the storage into one or more logical units that can be addressed by the host and be used as containers to store data. Each logical unit can be divided into a number of fixed size logical blocks, and the host can store/retrieve data at the granularity of a logical block. Still other storage servers are capable of servicing both file-level requests and block-level requests, as is the case with certain storage servers made by NetApp®, Inc. of Sunnyvale, Calif., employing the Data ONTAP® storage operating system.

A network storage system can be an individual storage server that provides one or more clients with access to data stored in a mass storage subsystem. Recently, however, with storage capacity demands increasing rapidly in almost every business sector, there has been a trend towards the use of clustered network storage systems, to improve scalability. In addition, as more and more business critical applications are being deployed on virtualized, shared infrastructure, there has been a trend towards using clustered network storage systems to improve reliability. In a clustered storage system, two or more storage server nodes are connected in a distributed architecture such that the storage server nodes operate in a coordinated manner to respond to client requests. Each storage server node is in fact a storage server, although it has a distributed architecture. Two or more such storage server nodes are typically connected to form a storage cluster, where each of the nodes in the cluster can communicate with the other nodes in the cluster.

A clustered architecture allows convenient scaling through the addition of more nodes, all capable of communicating with each other. Further, a storage cluster may present a single system image of stored data to clients and administrators, such that the actual location of data can be made transparent to clients and administrators. However, as the number of nodes in a cluster increases, maintaining a consistent single system image across the nodes of the cluster becomes a challenge as management and control operations are performed on the cluster resources.

SUMMARY

The storage system architecture and techniques introduced here provide a for presenting a single distributed logical unit, comprising one or more logical sub-units, as single logical unit of storage to a host system in a SAN-attached clustered storage system. In addition, the techniques provide a mechanism to coordinate the activities of the logical sub-units in such a way that the distributed implementation is transparent to a host system such that the logical sub-units are not visible to the host as separate entities and the host is presented with consistent block access protocol semantics to the distributed logical unit. This enables the distributed logical unit to service requests from multiple hosts without requiring any modification to the host or block access protocols. In accordance with the techniques introduced here, each logical sub-unit includes a task subset, a task sub-manager, and a device sub-server. The techniques provide a mechanism to coordinate the task sub-set management activities of the task sub-managers in such a way that the task sub-sets make up a single distributed task set that is maintained for the distributed logical unit. The techniques also provide a mechanism to coordinate the execution of commands from the distributed task set by the device sub-servers such that semantically correct task execution atomicity is maintained within the distributed logical unit.

Maintaining consistent global context information among the logical sub-units such that the logical sub-units are not visible to a host system as separate entities from the single distributed logical unit allows the SAN-attached clustered storage system to be expanded and/or modified without having to disrupt host system access. Further, because of the distributed nature of the logical unit, the system is more easily scalable and is more reliable or tolerant to faults in various hardware or software components that together form the SAN-attached clustered storage system.

The techniques further provide a mechanism for subsystems and/or objects of the storage system to coordinate transactions that modify the shared state in peer instances of the subsystems and/or objects throughout the cluster. Using the techniques introduced here, a cluster transaction manager abstracts cluster subsystems and objects into groups that share state. Transactions that affect the state of any given group are coordinated by the cluster transaction manager using a multi-phase voting process to ensure consistency of the shared state among the members of the group.

The techniques include receiving, by a group coordinator, a proposal from a client of the cluster transaction manager. The group coordinator initiates the multi-phase voting procedure among the members of a group affected by the proposal. The group coordinator gathers the responses from each of the group members and determines whether to commit the proposal or to discard the proposal. The group coordinator then provides the result of the voting procedure to the members of the group so that each of the group members can update its local instance of the shared state according to the result.

The techniques further provide a mechanism for nodes of SAN-attached cluster storage system to coordinate the origination of and response to heartbeat proposals used to determine whether each of the nodes in the cluster are active. Using the techniques introduced here, a master cluster quorum manager originates a heartbeat proposal using a communication system implemented by each node's cluster transaction manager. The master cluster quorum manager then determines, based on responses to the heartbeat proposal, which cluster nodes are in-quorum or out-of-quorum and notifies the cluster quorum manager of each node of the quorum status.

The techniques also include isolating an out-of-quorum node from the in-quorum nodes such that consistency is maintained in the in-quorum nodes. The isolation is implemented by sending a message from the cluster quorum manager to the cluster transaction manager in each node. The message identifies which nodes are in-quorum and which nodes are out-of-quorum. The cluster transaction manager of each of the in-quorum nodes can then block proposals from out-of-quorum nodes. Similarly, the techniques include a storage takeover procedure initiated by the cluster quorum manager of an in-quorum storage node that is a partner of an out-of-quorum node, such that the host requests for the storage on the out-of-quorum node can be serviced by the in-quorum partner node.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
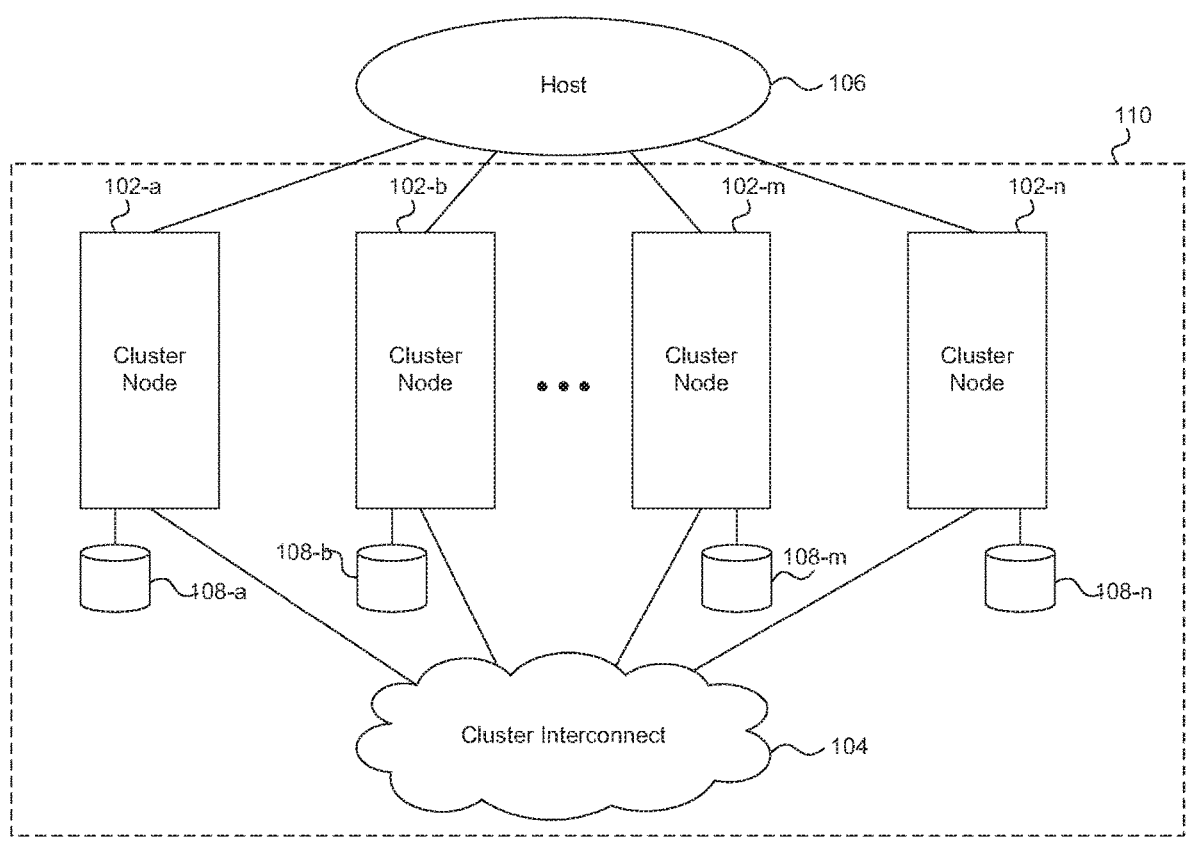
FIG. 1 shows an example of a storage area network (SAN) attached clustered storage system.

FIG. 1 shows an example of a clustered storage system in a storage area network (SAN) environment, which includes two or more cluster nodes 102a-102n and a cluster interconnect 104. At least one host 106 is connected with the cluster nodes 102. However, to facilitate description only a single host is depicted in FIG. 1.

As shown in FIG. 1, each cluster node 102 of the clustered storage system is coupled with a corresponding mass storage device 108a-108n. Typically, each cluster node 102 is coupled with two or more mass storage devices. However, to facilitate description a single mass storage device 108a-108n coupled with each corresponding cluster node 102a-102n is depicted in FIG. 1. The mass storage devices 108 can be of any one or more of various types of storage, such as magnetic disks, flash memory, solid-state drives (SSDs), tape storage, etc., and can be implemented as a single device, multiple devices, (e.g., a RAID group), or any other configuration of devices.

The SAN-attached clustered storage system can make some or all of the storage space on the mass storage devices 108 available to the host 106. For example, the host 106 can access a cluster node 102 of the SAN-attached clustered storage system using well known protocols, such as Internet Small Computer System Interface (iSCSI), Fibre Channel Protocol (FCP), or Fibre Channel over Ethernet (FCoE). The cluster node 102 can present or export data stored on the mass storage devices 108 as logical units (LUNs), for example, to the host 106. A cluster node 102 in the SAN-attached clustered storage system can communicate with each other cluster node 102 over the cluster interconnect 104, which can be implement, for example, as a Gigabit Ethernet switch. In one embodiment, the cluster nodes 102 are configured as high availability pairs. However, it is understood that other high availability configurations are possible.

Figure 2:
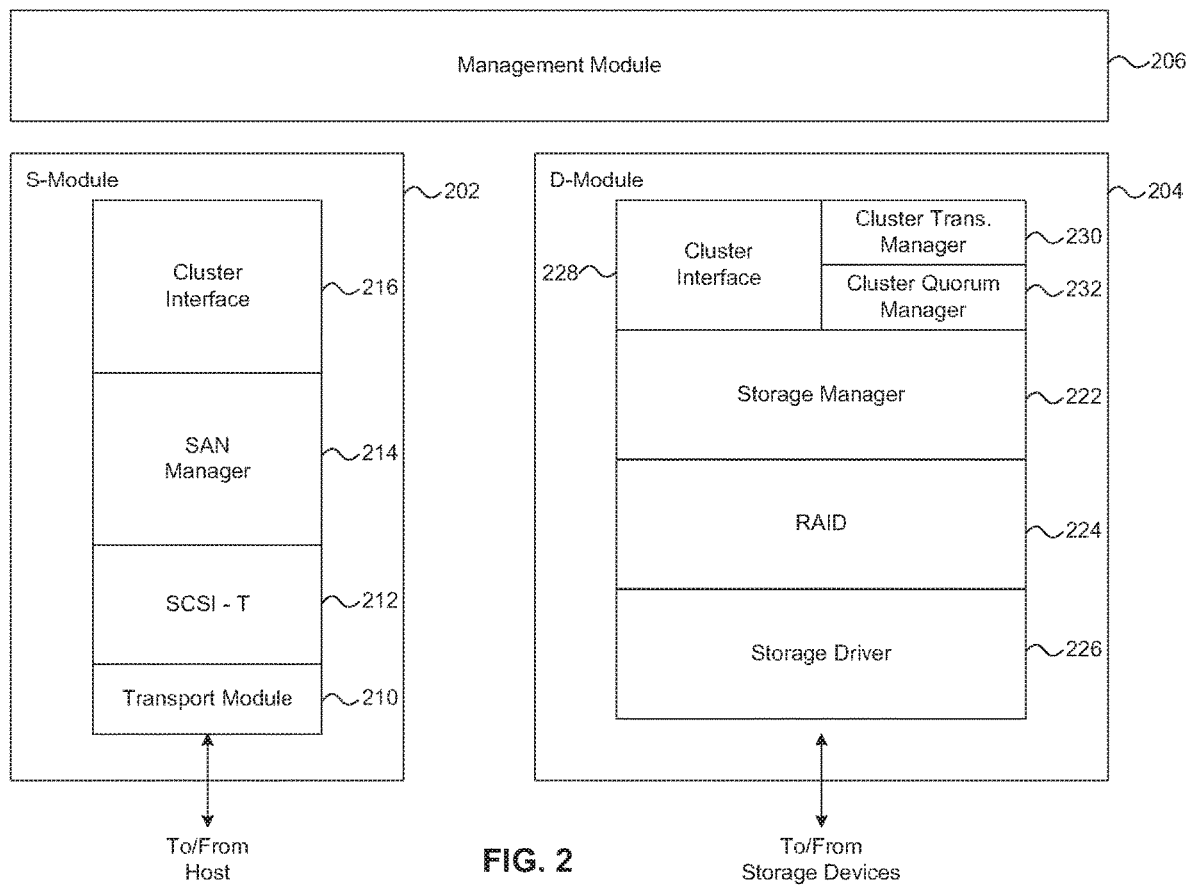
FIG. 2 illustrates an example of a storage operating system that can be used in a SAN-attached clustered storage system.

FIG. 2 illustrates an example of a storage operating system, which can be used to implement a node of a SAN-attached clustered storage system such as shown in FIG. 1. In the illustrated embodiment the storage operating system implements a cluster node 102 as a protocol (e.g., SAN) module (S-module 202), a data module (D-module 204), and a management module 206. The S-module 202, D-Module 204, and management module 206 may be implemented on the same or separate storage devices (e.g., storage controllers) or computers. The S-module 202 includes multiple functional components that provide a data path for a host to access information stored on the node using block access protocols, such as iSCSI, FCP, or FCoE. The functional components in combination with underlying processing hardware form the S-module 202. While described as function components of the S-module herein, the functional components can be logically located essentially any place in the storage operating system.

The functional components in the S-module 202 include a SCSI target instance (SCSI-T) 212 that includes a SCSI engine that performs the core SCSI protocol processing. The SCSI target instance 212 also includes functionality that allows the SCSI engine to work with other subsystems and components. The SCSI target instance 212 interacts with peer SCSI target instances on the other cluster nodes. As described in more detail below with reference to FIG. 3, each SCSI target instance 212 implements one or more target sub-devices, which collectively form a single distributed target device such that a host connected to the SAN sees a single target device. The functional components of the S-module 202 also include a SAN manager 214 which handles management operations in the SAN. For example, the SAN manager 214 coordinates cluster wide configuration updates. Further, the functional components of the S-module 202 include a cluster interface module 216 which implements intra-cluster communication with the D-module 204 and with other S-modules. Finally, the functional components of the S-module 202 include a transport module 210 that manages the FCP, iSCSI, or FCoE ports that connect to/from the host.

In addition, the storage operating system includes a set of data access components organized to provide data paths for accessing information stored on the storage devices of a node; these components in combination with underlying processing hardware form a D-module. To that end, the data access components include, for example, a storage manager module 222, a RAID system module 224, and a storage driver system module 226.

The storage manager 222 primarily manages the layout of data on the mass storage devices 108 and serves host-initiated read and write requests. The RAID system 224 manages the storage and retrieval of information to and from the storage devices 108 in accordance with a RAID redundancy protocol, such as RAID-4, RAID-5, or RAID-DP, while the storage driver system 226 implements a storage access protocol such as Small Computer System Interface (SCSI) or FCP. The D-module 204 also includes a cluster interface module 228 to implement an intra-cluster communication link with S-modules and/or other D-modules.

The nodes in a cluster can cooperate, through their respective cluster interface modules, to provide a single file system namespace across all D-modules in the cluster. Thus, any S-module that receives a data request can access any data container within the single file system namespace located on any D-module of the cluster, and the location of that data container can remain transparent to the host and its user.

The cluster interface modules 216 and 228 implement a protocol to communicate commands and data among the modules of cluster. Such communication can be effected by a D-module 204 exposing an application programming interface (API), to which an S-module 202 (or another D-module) issues calls. To that end, a cluster interface module can be organized as an encoder/decoder. The encoder of, for example, the cluster interface 216 on an S-module 202 can encapsulate a message as (i) a local procedure call (LPC) when communicating a file system command to a D-module 204 residing on the same node or (ii) a remote procedure call (RPC) when communicating the command to a D-module residing on a remote node of the cluster. In either case, the decoder of the cluster interface 228 on the D-module de-encapsulates the message and processes the included command.

The D-module 204 also includes a cluster transaction manager 230 and a cluster quorum manager 232. The cluster quorum manager 232 monitors the nodes that are currently members of the cluster and maintains a list of the active and available nodes in the cluster. The cluster transaction manager 230 provides the functionality to perform distributed operations as a single transaction that will either succeed or fail across all cluster nodes affected by the transaction. The cluster transaction manager 230 relies on the cluster quorum manager 232 to identify nodes that are active and available in the cluster. While the cluster transaction manager 230 and the cluster quorum manager 232 are shown as components of the D-module 204 in this description, they can be located logically at essentially any place in the operating system. For example, the operating system can include a common module, shared between the S-module 202 and D-module 204, in which the cluster quorum manager 232 and cluster transaction manager 230 can be located.

The storage operating system includes management components which provide a path for a storage administrator to request storage management operations on the SAN-attached clustered storage system. These management components are not germane to this disclosure, and thus are not described in detail. However, the management operations requested by a storage administrator are passed from the management module to the S-module 202 and/or D-module 204 where they are processed. The management components along with underlying processing hardware form the management module 206.

In the distributed architecture of the SAN-attached clustered storage system, a large number of management related transactions may need to be passed across the cluster to maintain the nodes 102 in a consistent state. A transaction, as used herein, is a process for communicating information, including management related proposals, among cluster nodes 102. For example, if a LUN is reconfigured, the new configuration may need to be transmitted to every entity in the cluster that maintains a record of the LUN configuration. However, passing transactions across the cluster consumes resources of the nodes 102, and if a large number of transactions are being processed, the node resources may be unable to perform other operations, such as serving data. Further, at least some management transactions may include multiple messages sent back and forth to complete the transaction, and not every node may be affected by a transaction. Therefore, if a transaction can be isolated to only those nodes affected by the transaction, nodes that are not affected by the transaction will not waste resources responding to the transaction, and there will be fewer transaction messages traveling across the cluster overall.

In order to more efficiently perform transactions in the cluster, therefore, the cluster transaction manager 230 can isolate transactions to a group of members that share an interest in group resources, such as a resource in the subsystem and/or an object for which the transaction is being performed. A group can be formed for a broad resource, such as a virtual server, or for a very granular resource, such as a specific port on a specific node. A group may include public and private members. Public members of a group are members that participate in every proposal that is distributed to the group. Every member that joins a group through a join proposal is a public member. Private members of a group are members that participate only in join and/or leave proposals. Proposals are described in detail below.

Figure 3:
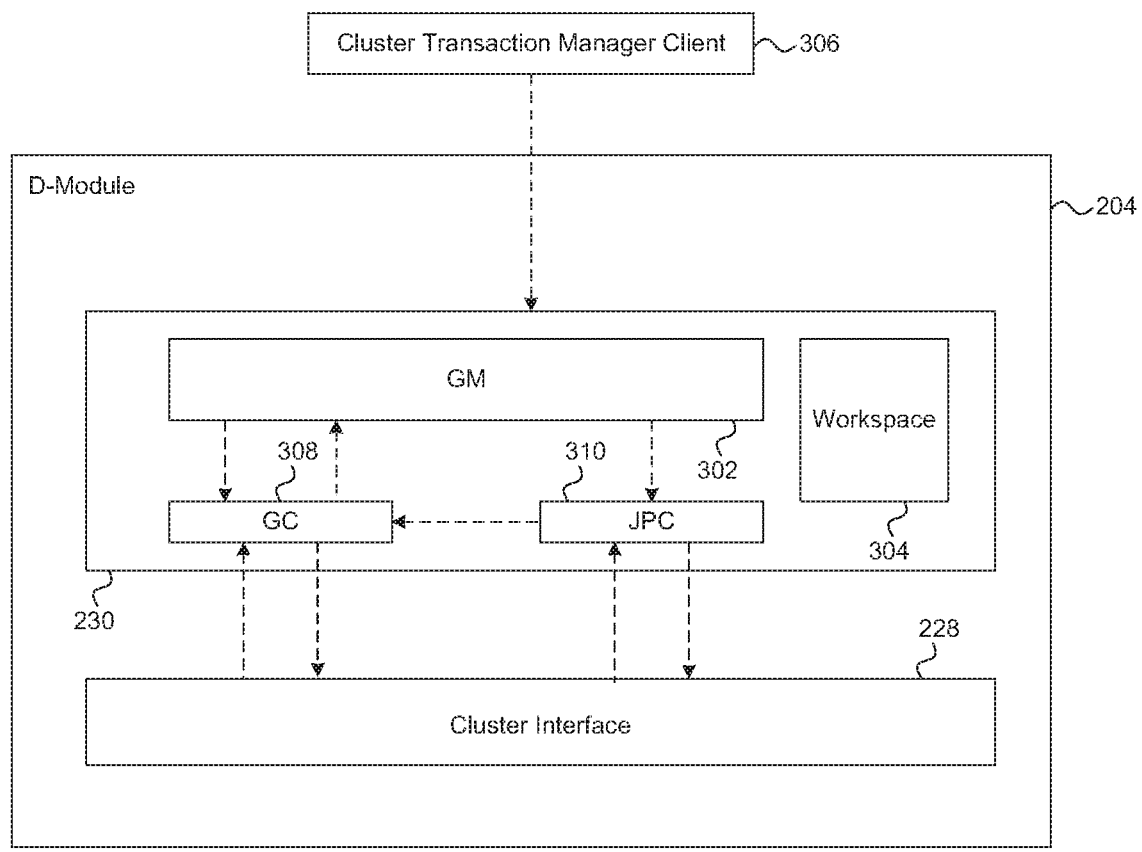
FIG. 3 shows an example block diagram of the components of a cluster transaction manager in the D-module of a cluster node.

FIG. 3 shows an example block diagram of the components of a cluster transaction manager 230 in the D-module 204 of a cluster node 102. The cluster transaction manager 230 maintains one or more group members (GM) 302 and an instance of a replicated workspace 304. As briefly described above, a group is an abstraction of cluster transaction manager clients 306 that share an interest in resources shared by that group. A cluster transaction manager client 306 is any entity that implements or consumes the APIs exposed by the cluster transaction manager. The SAN manager 214 and the SCSI target instance 212 of an S-module 202 are examples of cluster transaction manager clients 306.

The GM 302 is an abstraction of a transaction manager client 306. The GM 302 facilitates the processing of management and control operations on a cluster subsystem or object and communication of information between transaction manager clients 306. The GMs communicate via proposals transmitted to other GMs that have a shared interest in the subsystem or object. Only members of a group can send or receive proposals related to a group resource. Thus, in order to propose an operation on a group resource, a cluster transaction manager client 306 can join a group for that resource. To that end, the cluster transaction manager 230 exposes an API to allow cluster transaction manager clients 306 to join or leave a group. The GM 302 is created in a node 102 when a cluster transaction manager client 306 on that node calls the cluster transaction manager API to join a group. The process of a group member join/leave is described in detail below. Each GM 302 is identified by a unique ID. Each node 102 can include zero or more GMs of a group.

Each group has a group workspace, as part of the shared workspace 304, which is a collection of data associated with the subsystems and/or objects that are being managed within the context of the group. The workspace 304 is replicated across the nodes 102 of the cluster, such that each node 102 has access to a local copy of the workspace 304. The objects are identified in the group workspace by their object identifier (OID). The OIDs are used in serialization of transactions, as described below.

The cluster transaction manager 230 of FIG. 3 also maintains a group coordinator (GC) 308 and a join proposal coordinator (JPC) 310. Each group has one GC 308. The GC 308 is designated to coordinate transactions within the group. While the GC 308 is depicted as a residing on the node 102 of FIG. 3, a GC 308 can reside on any node 102 within the cluster. In one embodiment, the GC is provisioned or created on the node that includes the first GM to join a group. If the node hosting the GC leaves the group, another node from the group can be selected to host the GC. For example, the node hosting the GM with the lowest group member ID can be selected to host the GC. Each GM 302 maintains a record of which node is currently hosting the GC 308. A GM 302 that wants to perform an operation on a resource shared by the group contacts the GC 308 of the group to coordinate the transaction. The transaction process is described in more detail below.

The JPC 310 is the GC for a special group that includes all active cluster nodes in the cluster. Membership of a node 102 in the active cluster nodes group is automatic when the node 102 becomes part of the cluster. The JPC 310 is also a private member of every group in the cluster and responds to all group join and leave proposals. As such, the JPC 310 coordinates all requests to join a group from any cluster transaction manager client 306 in the cluster. The JPC 310 maintains a list of currently active groups and the GMs and GC of each currently active group. In one embodiment, if a node 102 is the first node in a cluster, it is automatically designated as the hosting the JPC 310. If that node later leaves the cluster, the role of JPC can be assigned to another node. This new JPC can use voting proposals to take a census of each GM of the active cluster nodes group in order to acquire the current state of the groups and their membership.

Transactions and proposals are discussed in detail below with reference to FIGS. 4 through 8. As discussed above, communication among group members takes place through transactions. A transaction, as used herein, is a process for communicating information among cluster nodes 102. A transaction can be initiated across all of the nodes 102 that include entities that are members of a group. Transactions can be of two types. First, there can be a single proposal transaction that consists of a single proposal. Second, there can be a multiple proposal transaction that allows a GM to submit multiple proposals that are treated as a single serialized transaction. A multiple proposal transaction guarantees a GM serialization across the set of proposals in the transaction until the transaction has completed (i.e., no other serialized transactions can interrupt the proposals of the multiple proposal transaction). Serialized transactions are used to maintain consistency in the instances of shared state (e.g., the members of a group or the configuration of shared resources) among the members of the group. Some high-priority proposals, for example, cluster heartbeat proposals, can be approved through unserialized transactions. Unserialized transactions are processed as they are received, without regard to whether other transactions are currently processing.

In one embodiment, unserialized transactions can be committed consistently among the group members by enabling group-wide sequencing. Group wide-sequencing can be enabled by any GM upon joining the group. Group-wide sequencing is set by including a group-wide sequencing indicator in the request from the GM to join the group. If the group-wide sequencing indicator is present in the group data structure, multiple unserialized transactions can be processed in parallel, however, the GC ensures that the transactions are committed in a specified order by each GM. In one embodiment, the GC ensures that the transactions are committed in a specified order by using a single execution thread to send the result of the transaction (e.g., an instruction to commit the proposed operation) to each GM. Thus, the results are processed, and therefore committed by each GM, in the specified order.

Proposals can be of a few different types. The first, and most common, type of proposal is a voting proposal. A voting proposal provides a multi-phase commit process as described below with reference to FIG. 4 for management and control operations and allows for the operations to be consistently applied across the cluster nodes. A second type of proposal is an informative proposal. An informative proposal broadcasts a certain payload to all of the members of a group without requiring a response. Finally, a third type of proposal is a read proposal. A read proposal allows the group member that sends the proposals to collect information from each of the other members of the group. Further, any of these proposals can also be targeted directly to one or more group members rather than to the group as a whole. These proposals are discussed in more detail below.

Figure 4:
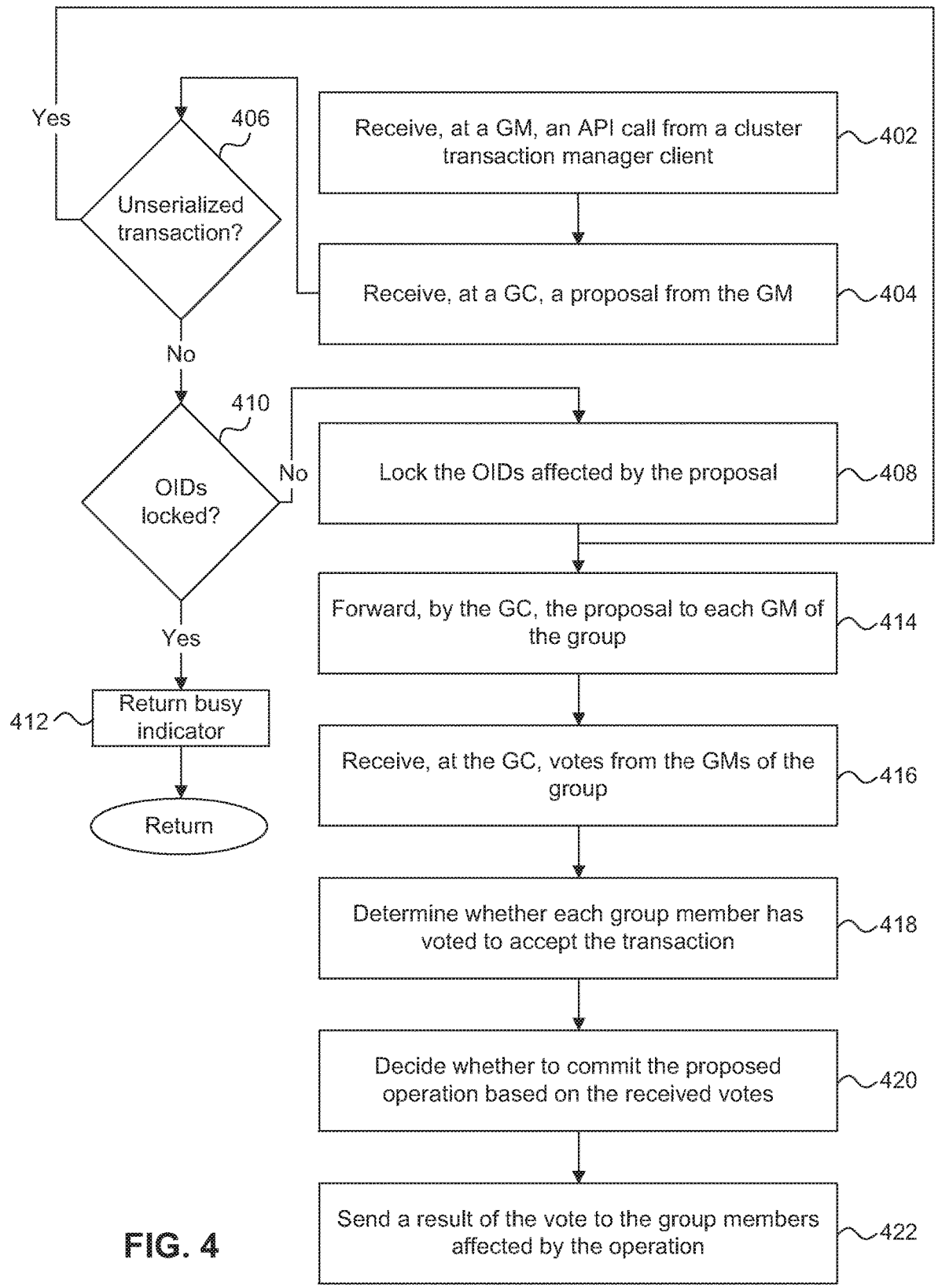
FIG. 4 is a flow diagram of a process for coordinating and processing a voting proposal in a SAN-attached clustered storage system.

FIG. 4 is a flow diagram of a process for coordinating and performing a voting proposal in a SAN-attached clustered storage system. The process is organized as a sequence of operations in the flowchart. However, it should be understood that at least some of the operations associated with this process potentially can be reordered, supplemented, or substituted for, while still performing the same overall technique.

As described above, the cluster transaction manager coordinates management and/or control operations across the cluster. For example, a cluster transaction manager client 306 can propose an operation to change the configuration of a cluster subsystem or object, such as changing the configuration of a LUN. Assuming the cluster transaction manager client 306 is a member of the group associated with the cluster subsystem or object, the cluster transaction manager client 306 can initiate a transaction to perform the operation by calling a voting proposal API exposed by the cluster transaction manager 230.

At step 402, the GM 302 associated with the cluster transaction manager client 306 receives, from the client 306, an API call for a voting proposal. For example, as described below with reference to FIGS. 5A and 5B, an API call can include a voting proposal that includes, among other things, an indication that it is a group join proposal and a group ID. As described above, multiple proposals that are to be processed in a single transaction can be received from the client; however, to facilitate description, it is assumed that a single proposal is received. The GM 302 looks up the location of the GC, from the GM's local record, and forwards the voting proposal to the GC. At step 404, the GC 308 receives the voting proposal from the GM 302 and determines, at step 406, whether the voting proposal is marked as unserialized. If the voting proposal is marked as unserialized, the process continues to step 414 where the GC 308 forwards the voting proposal to each GM of the group for approval. Step 414 is described in more detail below.

If the voting proposal is not marked as unserialized (i.e., the voting proposal is marked as serialized), the GC 308 determines whether another transaction affecting the group is being processed or whether the voting proposal can be processed. Proposals are serialized (e.g., queued up) by the GC 308 based on OIDs, such that only one serialized proposal at a time can be processed for a specific OID. Each proposal includes a list of the OIDs affected by that proposal. The cluster transaction manager client 306 includes the list of OIDs on which the proposal operates in the API call. For example, if the proposal was to modify the configuration of a LUN, the cluster transaction manager client 306 would include the OID for the LUN in the API call. Once a transaction has been initiated, the GC 308 locks the OIDs affected by the transaction until the transaction is complete by maintaining and updating a list of locked OIDs which are used to compare with the OID to be operated on. In one embodiment, the GC maintains a queue of the GMs in the group to control the order in which GMs can submit a proposal. This queue allows the GC to treat requests from each GM without taking the location of the GM into account, such that a remote GM is not at a disadvantage to a local GM.

After the GC 308 has received the voting proposal and determined that it is a serialized proposal, at step 410 the GC 308 compares the OIDs included in the proposal with the OIDs that have been locked. In the case of a multi-proposal transaction, all of the OIDs from each of the proposals are checked against the locked OIDs. If any of the OIDs in the proposal(s) are locked, at step 412 the GC 308 returns a busy indicator to the GM 302 that sent the proposal. The GM 302 is responsible for responding to the busy indicator. For example, the GM 302 can queue the proposal and retry it after a period of time. If none of the OIDs from the voting proposal are locked, at step 408 the GC 308 locks the OIDs affected by the voting proposal and at step 414 forwards the voting proposal to each GM of the group, including the proposal originator GM 302.

Each GM 302 in the group receives the proposal from the GC 308 and presents the proposal to its cluster transaction manager client 306 using a client callback function. The cluster transaction manager client 306 responds to the GM 302, through a Respond API, with an indication that the cluster transaction manager client 306 either accepts or rejects the proposal. The GM 302 then forwards the response to the GC 308 which, at step 416, receives the responses from each GM. At step 418, the GC 308 tallies the responses and determines whether each GM has accepted the proposal. The GC 308, at step 420, then decides whether to commit the proposal (i.e., carry out the requested operation) based on the tallied responses. In one embodiment, the GC 308 decides to commit the proposal only if a unanimous acceptance of the proposal is received from the GMs. In another embodiment, the GC 308 decides to commit the proposal if a majority, or any other specified number or subset, of the clients accept the proposal.

In response to deciding whether to commit the proposal, at step 422, the GC 308 sends a result to the GMs. In one embodiment, the result can be a command to either commit or to discard the proposal. In either case, each GM 302 forwards the result, for example, by using the client callback function as described above, to its cluster transaction manager client 306 where the proposal can either be committed or discarded. If the proposal is committed, each GM 302 updates its instance of the shared state. Each cluster transaction manager client 306 responds by calling an API that indicates that the proposal has been committed or discarded. The indication is forwarded by the GM 302 to the GC 308. The GC 308 can then unlock the OIDs (e.g., by updating the list of locked OIDs) such that the next serialized transaction can be processed.

Figure 5A:
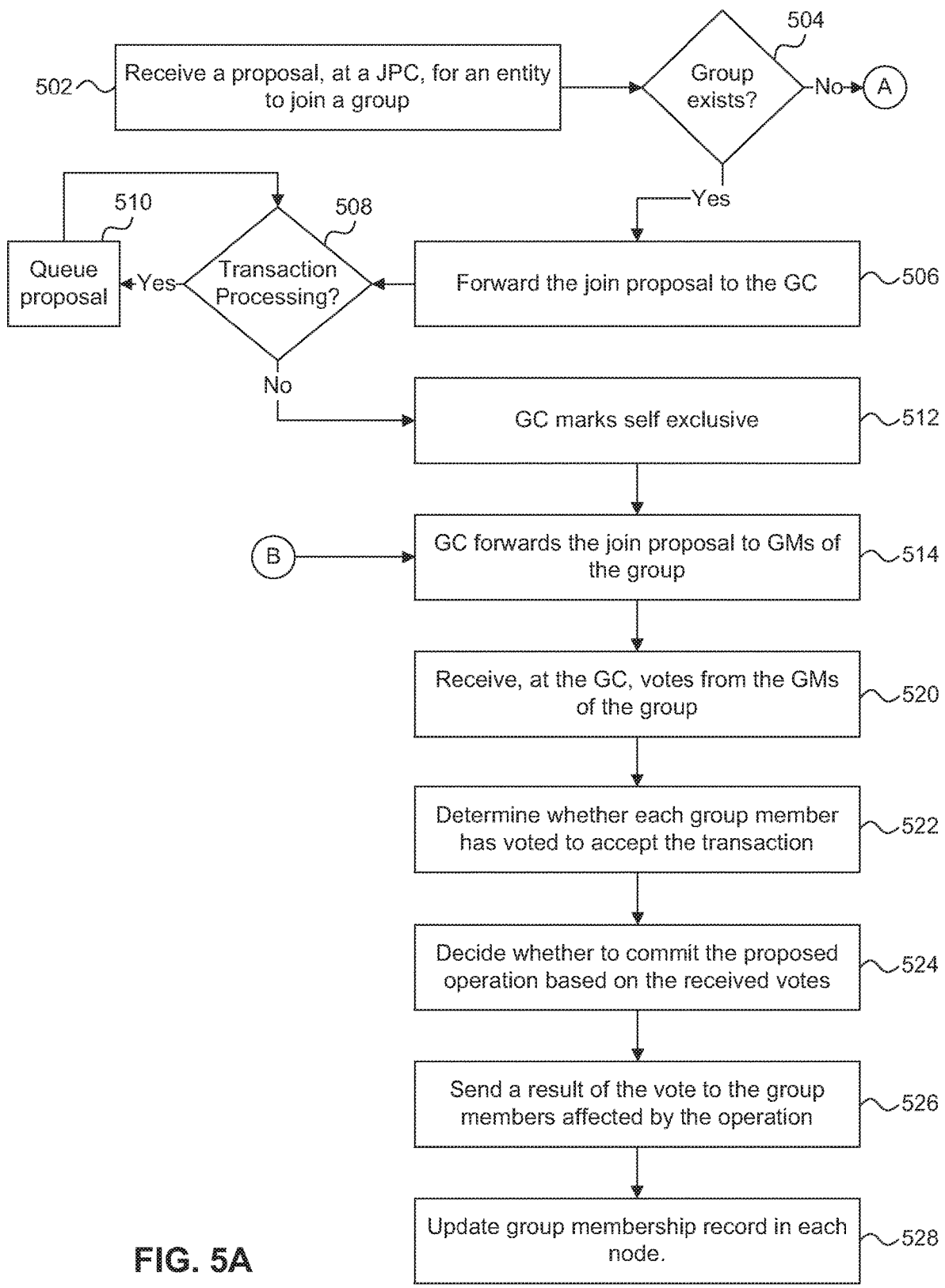
FIGS. 5A and 5B collectively are a flow diagram of a process for coordinating and processing a group join proposal in a SAN-attached clustered storage system.
Figure 5B:
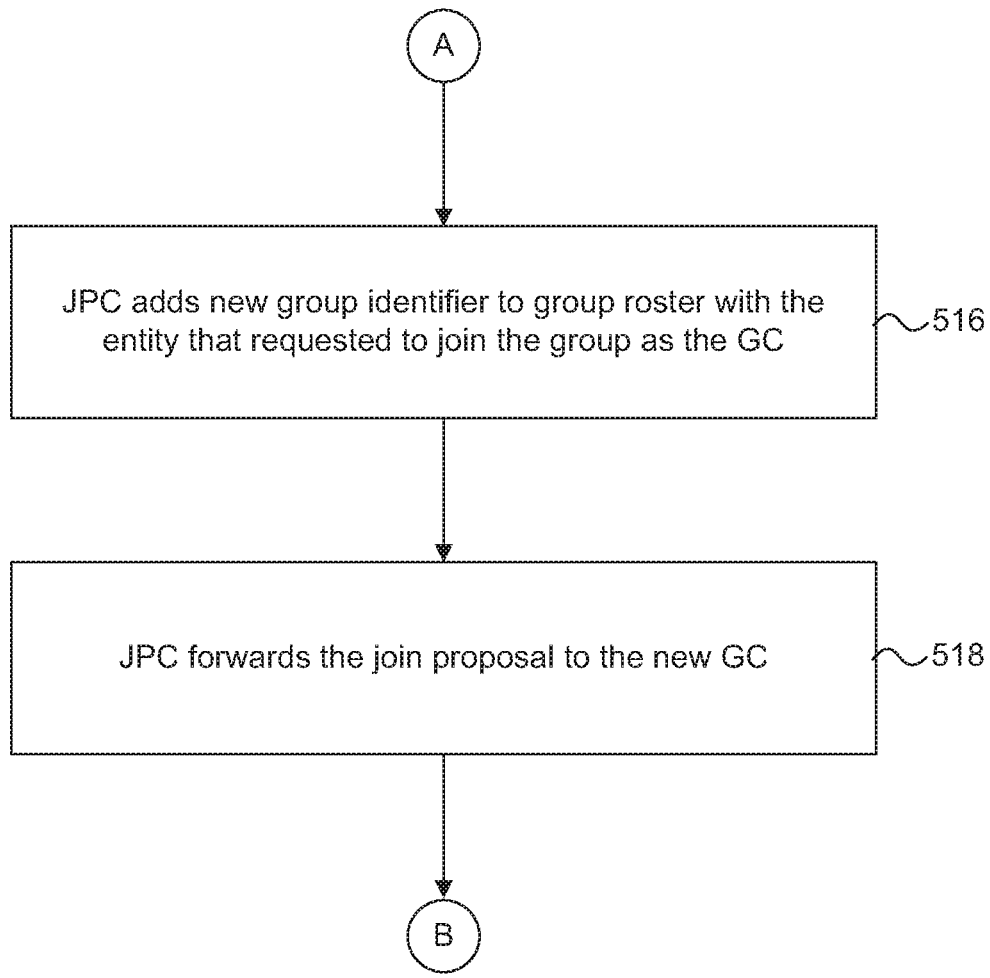

FIGS. 5A and 5B collectively are a flow diagram of a process for coordinating and processing a Group Join proposal in a SAN-attached clustered storage system. A Group Join proposal is a special case of a voting proposal. The process is organized as a sequence of operations in the flowchart. However, it should be understood that at least some of the operations associated with this process potentially can be reordered, supplemented, or substituted for, while still performing the same overall technique.

In order for a cluster transaction manager client 306 to propose a management or control operation on a shared resource in the cluster, the cluster transaction manager client 306 must be a member of a group for that resource. Thus, if a cluster transaction manager client 306 is not currently a member of the group, the cluster transaction manager client

306 must join the group before the cluster transaction manager client 306 can propose operations. As described above, the JPC 310 coordinates Group Join proposals. To join a group, the cluster transaction manager client 306 calls a group join API exposed by the cluster transaction manager 230. The cluster transaction manager 230, in response to receiving the API call, creates a GM 302 for the client which forwards the proposal to the JPC 310.

At step 502, the JPC 310 receives the Join proposal. The Join proposal includes a group identifier for the group that the cluster transaction manager client 306 is proposing to join. As described above, the JPC 310 maintains a list of currently active groups in the cluster and checks the list of currently active groups, at step 504, to determine if a group matching the proposed group identifier exists. If the group exists, at step 506, the JPC 310 forwards the Join proposal to the GC 308 for the group.

In response to receiving the Join proposal, at step 508, the GC determines whether other transactions are being processed. In one embodiment, Group Join proposals are exclusive proposals, meaning that no other transactions are processed during the group join transaction. This ensures that no changes are made to the group, the membership list of the group, or to the shared workspace while a Join proposal is in progress. If, at step 508, the GC 308 determines that there are currently transactions in progress the GC 308 queues the Join proposal at step 510. While there is a proposal in the queue, the GC 308 replies to any other proposal with a busy indication. When the GC 308 has completed processing the transaction(s) in progress, the Join proposal in the queue is processed as described below.

If, at step 508, the GC 308 determines that there are no transactions in progress, at step 512 the GC 308 marks itself exclusive by setting a flag within the GC data structure, for example, and forwards the join proposal to each member of the group, including the GM 302 for the cluster transaction manager client 306 proposing to join the group, at step 514. If, at step 504, the JPC 310 determines that a group matching the proposed group identifier does not exist, at step 516 of FIG. 5B the JPC 310 adds a new group identifier to the list of currently active groups. The membership of the group is initially set to include the GM 302 of the requesting client as the GC 308 and a public member of the group and the JPC 310 as a private member of the group. The JPC 310, at step 518, then forwards the Join proposal to the newly created GC 308. The GC 308 forwards the Join proposal, at step 514, to each member of the group.

Each GM receives the join proposal and presents the join proposal to its cluster transaction manager client 306 using a client callback function. The cluster transaction manager client 306 responds to the GM 302, through a Respond API, with an indication that the cluster transaction manager client 306 either accepts or rejects the Join proposal. The GM 302 then forwards the response to the GC 308 which, at step 520, receives the responses from each GM. At step 522, the GC 308 tallies the responses and determines whether each GM has accepted the proposal. The GC 308, at step 524, then decides whether to commit the proposal based on the tallied responses. In one embodiment, a join proposal is committed only if the GC 308 receives a unanimous accept.

In response to deciding whether to commit the join proposal, at step 526, the GC 308 sends a result to the GMs. In one embodiment, the result can be a command to either commit the proposal or to discard the proposal. In either case, each GM 302 forwards the result to its cluster transaction manager client 306 where the proposal can either be committed or discarded. The cluster transaction manager client 306 responds by calling an API that indicates that the proposal has been committed or discarded, which is forwarded by the GM 302 to the GC 308 and the GC 308 releases its exclusive status. If the proposal is committed and the cluster transaction manager client 306 joins the group, at step 528, each GM updates the group membership record maintained in its node.

Figure 6:
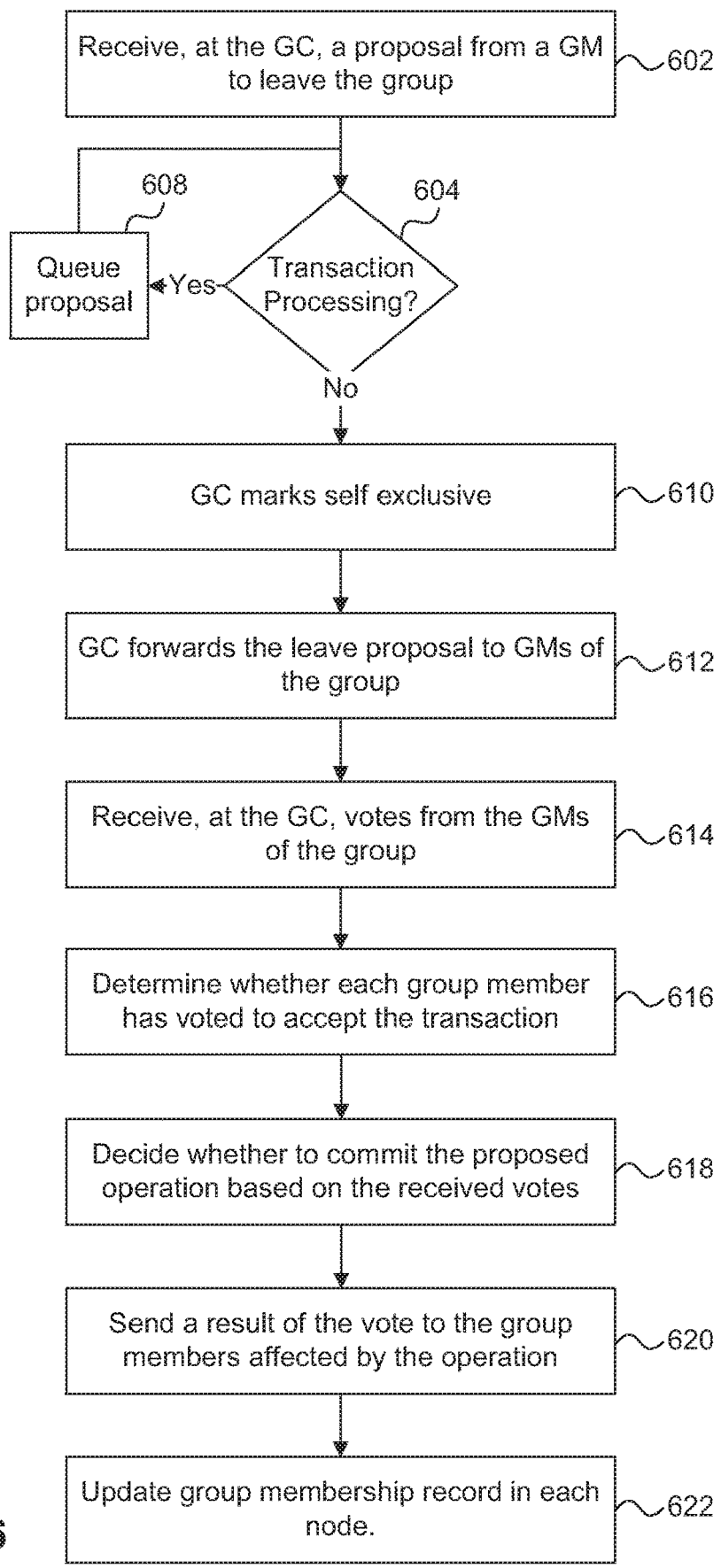
FIG. 6 is a flow diagram of a process for coordinating and processing a group leave proposal in a SAN-attached clustered storage system.

FIG. 6 is a flow diagram of a process for coordinating and processing a group Leave proposal in a SAN-attached clustered storage system. A Leave proposal is a special case of a voting proposal. The process is organized as a sequence of operations in the flowchart. However, it should be understood that at least some of the operations associated with this process potentially can be reordered, supplemented, or substituted for, while still performing the same overall technique.

In order to leave a group, a client calls a Leave Group API exposed by the cluster transaction manager. In response to the Leave Group API call, the GM 302 for the cluster transaction manager client 306 sends a Leave proposal to the GC 308. The GC 308 receives the Leave proposal at step 602, and in response to receiving the Leave proposal, determines, at step 604, whether other transactions are currently being processed. In one embodiment, Group Leave proposals are exclusive proposals similar to the Join proposals as described above. If the GC 308 determines that there are currently transactions in progress, at step 608, the GC 308 queues the Leave proposal. When the GC 308 determines that the transaction(s) in progress have completed, the Leave proposal in the queue is processed as described below.

If, at step 604, the GC 308 determines that there are no transactions in progress, at step 610 the GC 308 marks itself exclusive and forwards the Leave proposal to each member, public and private, of the group at step 612. Each GM 302 receives the leave proposal and presents the Leave proposal to its cluster transaction manager client 306 using a client callback function. The cluster transaction manager client 306 responds to the GM 302, through a Respond API, with an indication that the cluster transaction manager client 306 either accepts or rejects the Leave proposal. The GM 302 then forwards the response to the GC 308 which, at step 614, receives the responses from each GM. At step 616, the GC 308 tallies the responses and determines whether each GM has accepted the proposal. The GC 308, at step 618, then decides whether to commit the leave proposal based on the tallied responses. In one embodiment, the Leave proposal is committed only if the GC 308 receives a unanimous accept.

In response to deciding whether to commit the leave proposal, at step 620, the GC 308 sends a result to the GMs. In one embodiment, the result can be to either commit or to discard the Leave proposal. In either case, each GM 302 forwards the result to its cluster transaction manager client 306 where the proposal can either be committed or discarded. The cluster transaction manager client 306 responds by calling an API that indicates that the proposal has been committed or discarded, which is forwarded by the GM 302 to the GC 308 and the GC 308 releases its exclusive status. If the proposal is committed and the cluster transaction manager client 306 leaves the group, at step 622, each GM 302 updates the group membership record maintained in its node.

Figure 7:
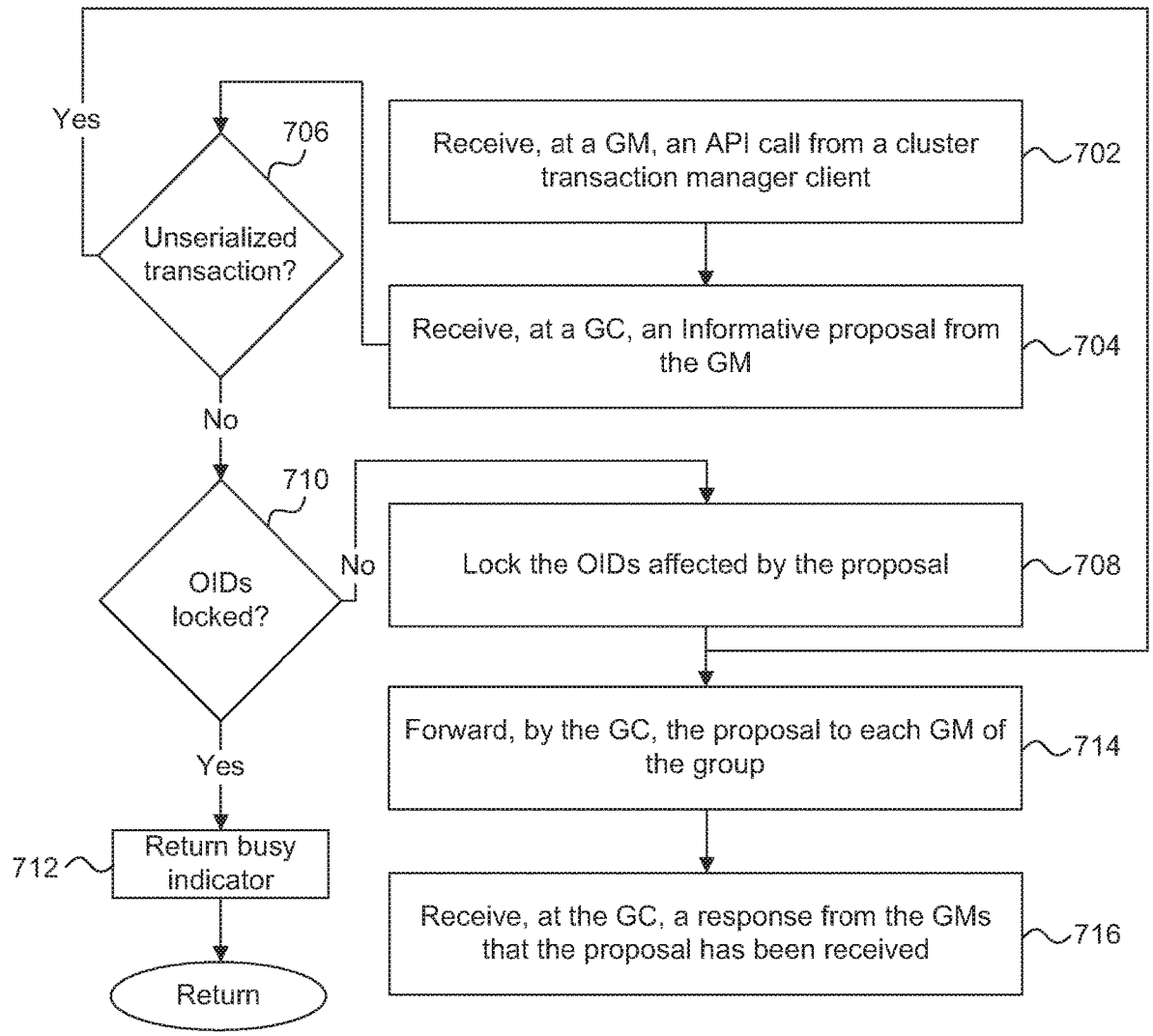
FIG. 7 is a flow diagram of a process for coordinating and processing an informative proposal in a SAN-attached clustered storage system.

FIG. 7 is a flow diagram of a process for coordinating and processing an informative proposal in a SAN-attached clustered storage system. An informative proposal, for example, can be a proposal that indicates the current state of a group including the group membership. The process is organized as a sequence of operations in the flowchart. However, it should be understood that at least some of the operations associated with this process potentially can be reordered, supplemented, or substituted for, while still performing the same overall technique.

At step 702, the GM 302 associated with a cluster transaction manager client 306 receives, from the cluster transaction manager client 306, an API call for an informative proposal. For example, the API call can include a message that is to be communicated to each member of the group. The GM 302 looks up the location of the GC 308, from the GM's local record, and forwards the informative proposal to the GC 308. At step 704, the GC 308 receives the informative proposal from the GM 302 and determines, at step 706, whether the informative proposal is marked as unserialized. If the informative proposal is marked as unserialized, the process continues to step 714 where the GC 308 forwards the informative proposal to each member of the group for approval. Step 714 is described in more detail below.

If the informative proposal is not marked as unserialized (i.e., the informative proposal is marked as serialized), the GC 308 determines whether another transaction affecting the group is being processed or whether the informative proposal can be processed. Informative proposals can be serialized in a similar manner as discussed above with regard to voting proposals.

After the GC 308 has received the informative proposal and determined that it is a serialized proposal, at step 710 the GC 308 compares the OIDs included in the proposal with the OIDs that have been locked. In the case of a multi-proposal transaction, all of the OIDs from each of the proposals are checked against the locked OIDs. If any of the OIDs in the proposal(s) are locked, at step 712 the GC 308 returns a busy indicator to the GM 302 that sent the proposal. The GM 320 is responsible for responding to the busy indicator. For example, the GM 302 can queue the proposal and retry it after a period of time. If none of the OIDs from the informative proposal are locked, at step 708 the GC 308 locks the OIDs affected by the informative proposal and at step 714 forwards the informative proposal to each member of the group, including the proposal originator GM 302.

Each GM in the group receives the informative proposal from the GC 308 and presents the proposal to its cluster transaction manager client 306 using a client callback function. In one embodiment, at step 716 the cluster transaction manager client 306 responds to the GM 302, through a Done API, with an indication that the cluster transaction manager client 306 has received the informative proposal. The GC 308 can then unlock the OIDs such that the next serialized transaction can be processed.

Figure 8:
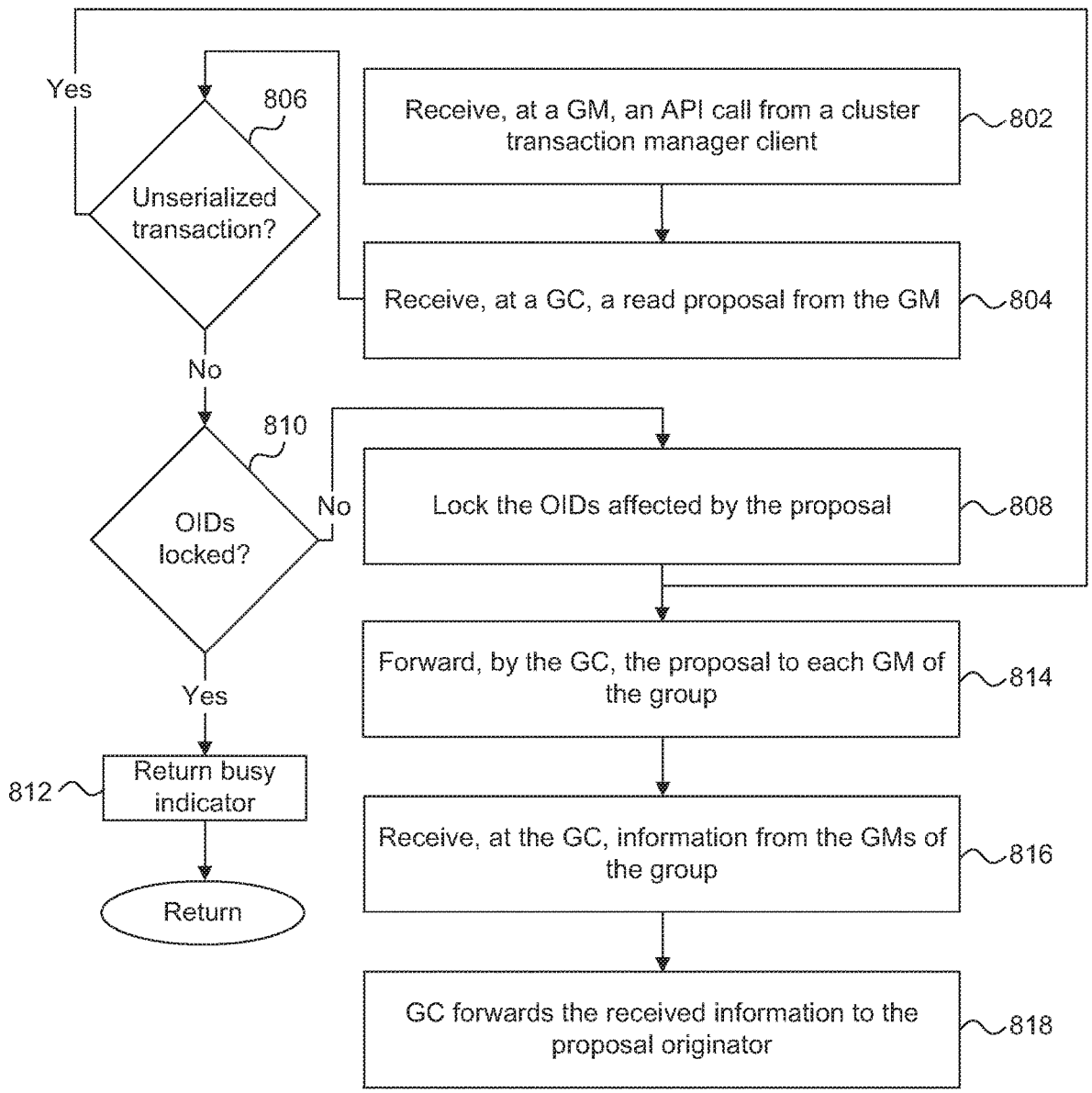
FIG. 8 is a flow diagram of a process for coordinating and processing a read proposal in a SAN-attached clustered storage system.

FIG. 8 is a flow diagram of a process for coordinating and processing a read proposal in a SAN-attached clustered storage system. A read proposal, for example, can be a proposal to acquire the current state of counters within the group. The process is organized as a sequence of operations in the flowchart. However, it should be understood that at least some of the operations associated with this process potentially can be reordered, supplemented, or substituted for, while still performing the same overall technique.

At step 802, the GM 302 associated with a cluster transaction manager client 306 receives, from the cluster transaction manager client 306, an API call for a read proposal. For example, the API call can include a message that is to be communicated to each member of the group. The GM looks up the location of the GC 308, from the GM's local record, and forwards the read proposal to the GC 308.

At step 804, the GC 308 receives the read proposal from the GM 302 and determines, at step 806, whether the read proposal is marked as unserialized. If the read proposal is marked as unserialized, the process continues to step 814 where the GC 308 forwards the read proposal to each member of the group for approval. Step 814 is described in more detail below.

If the read proposal is not marked as unserialized (i.e., the read proposal is marked as serialized), the GC 308 determines whether another transaction affecting the group is being processed or whether the read proposal can be processed. Read proposals can be serialized in a similar manner as discussed above with regard to voting proposals.

After the GC 308 has received the read proposal and determined that it is a serialized proposal, at step 810 the GC 308 compares the OIDs included in the proposal with the OIDs that have been locked. In the case of a multi-proposal transaction, all of the OIDs from each of the proposals are checked against the locked OIDs. If any of the OIDs in the proposal(s) are locked, at step 812 the GC 308 returns a busy indicator to the GM 302 that sent the proposal. The GM 302 is responsible for responding to the busy indicator. If none of the OIDs from the read proposal are locked, at step 808 the GC 308 locks the OIDs affected by the read proposal and at step 814 forwards the read proposal to each member of the group.

Each GM 302 in the group receives the read proposal from the GC and presents the proposal to its cluster transaction manager client 306 using a client callback function. At step 816 the cluster transaction manager client 306 responds to the GM 302, through a Respond API, with the information requested by the proposal originator. The GC 308 then, at step 818, forwards the information to the proposal originator GM 302. The proposal originator GM 302 can then pass the information to the cluster transaction manager client 306.

As described above, the processing of transactions can include many function calls and messages. It is possible for any of the function calls to fail or the messages to not reach their destinations. In one embodiment, all of the internal functions (e.g., communication between GMs, GCs, and callbacks) and external APIs that could potentially fail return a status code, even if the status code is a failure. Callers of such functions can initiate fault management actions if the status code indicates failure.

Additionally, a timer is implemented for each function call or communication message, to ensure that a failure status code is returned if the function call or communication is not successful or not responded to within a set time. When a proposal is queued for later processing, an indication to that effect can be provided to the requesting application so that application level timers may be re-adjusted to reflect any delays due to the queuing.

One reason a failure may occur is that the workspace associated with the OID(s) affected by a proposal may be inconsistent between the GMs. Another reason a failure may occur is that the workspace associated with the group may be inconsistent between the GMs. Yet another reason that a failure may occur is that the cluster workspace is not consistent between the nodes of the cluster. For example, if the group membership record maintained by a GC is not accurate (e.g., includes a GM that is no longer part of the group), a voting proposal processed by the GM may fail because a response is not received from the missing GM. Because the majority, if not all faults, in the described system can be attributed to one of the above reasons, fault management operations can be implemented at the time of the fault to correct the fault.

Figure 9:
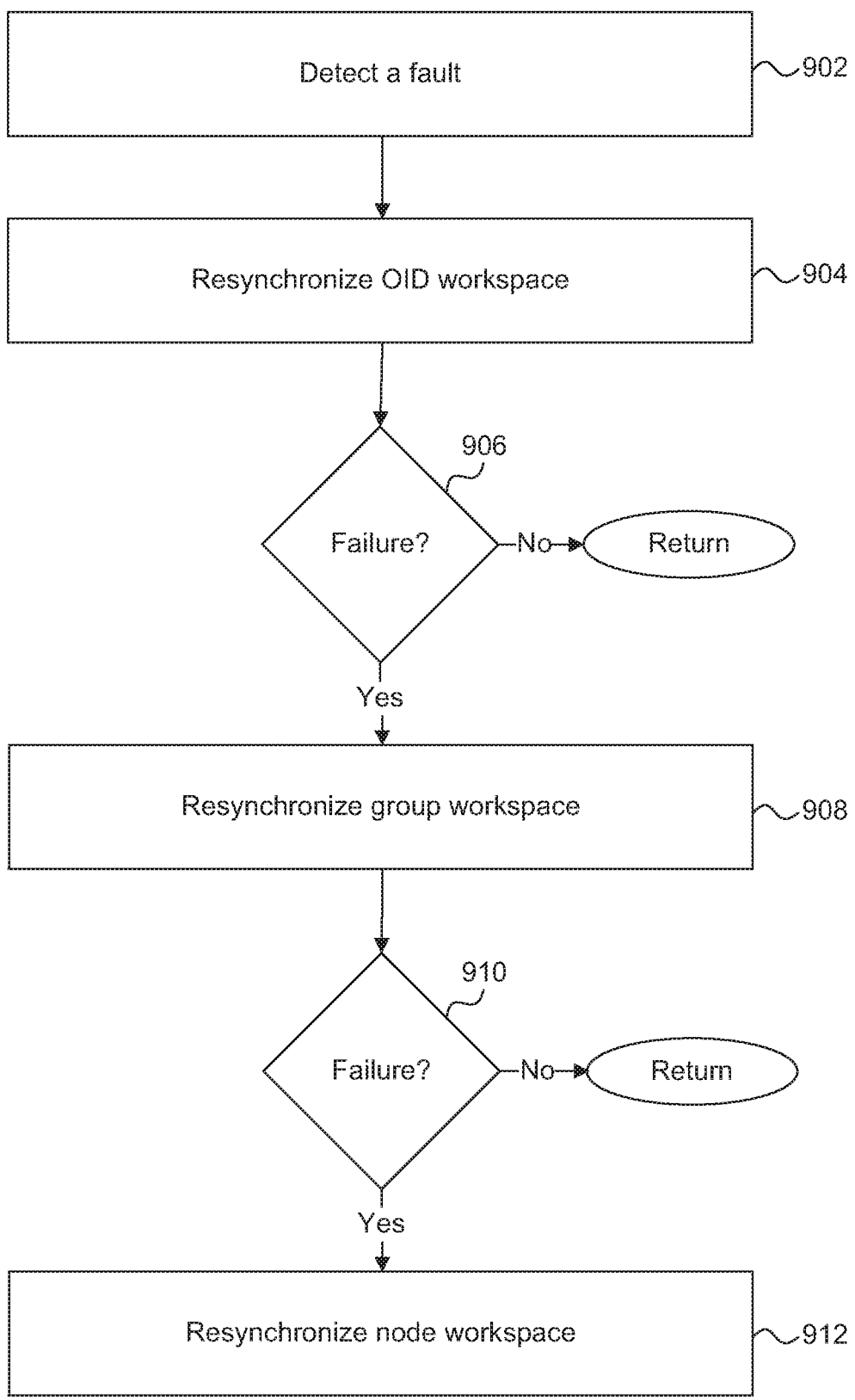
FIG. 9 is a flow diagram of a process for recovering from a failure condition in a SAN-attached clustered storage system.

FIG. 9 is a flow diagram of a process for recovering from a failure condition in a SAN-attached clustered storage system. The process is organized as a sequence of operations in the flowchart. However, it should be understood that at least some of the operations associated with this process potentially can be reordered, supplemented, or substituted for, while still performing the same overall technique.

The process begins, at step 902, when a function caller or a message sender detects a fault by, for example, receiving a status code that indicates a failure. In response to detecting a failure, at step 904, the function caller, for example client 306, calls a Resync OID Workspace function. In one embodiment, when a client 306 detects that it is out of sync with the remainder of the group (e.g., by virtue of a failed heartbeat as discussed further below), the client 306 recovers by floating a proposal to get the current state of the out of sync data. This method can be used to recover a single out of sync OID. At step 906, if the GM 302 that caused the error returns a successful result, in response to the proposal to resynchronize its OID workspace, no further action is taken, and the cluster continues to operate normally. However, if, at step 906, the GM that was caused the error returns a failed result, or does not respond, then, at step 908, the GC 308 escalates the fault recovery to the next level and initiates a transaction to resynchronize the group workspace.

In one embodiment, the GC 308 initiates an eviction of the non-responsive GM, which includes notifying the remaining GMs of the changed group membership. After the GM has been evicted, the GM will receive a callback that it has been evicted and can then attempt to rejoin the group. In the meantime, the GC 308 continues to process transactions among the remaining members of the group. When the GM has successfully rejoined the group, the group workspace is once again in sync and the cluster continues to operate normally.

However, if the GM is not able to voluntarily leave the group or the GC 308 is unable to evict the non-responsive GM from the group, at step 910, the GC 308 escalates the fault recovery to the next level and attempts to resynchronize the node. In response to the escalation, the quorum cluster manager 232 removes the node from the cluster quorum, at step 912, and can then attempt to bring the node back into the cluster quorum.

One of the many functions provided by the cluster transaction manager 230 discussed above is helping to maintain consistency between distributed objects in the clustered storage system. Referring again to FIG. 2, one of the distributed objects that relies on the cluster transaction manager 230 is the SCSI target 212. The architecture of the SCSI target 212, in one embodiment, is based on the SCSI Architecture Model defined by T10, the SCSI standard providing body. As briefly described above, the SCSI targets implement one or more target sub-devices and presents a single system view of the target sub-devices to the host (SCSI initiator) 106. However, because of the distributed cluster model, each node 102 internally implements a SCSI target instance 212 that cooperates with each of the other SCSI target instances in the cluster to provide a consistent and scalable cluster. The distributed SCSI target instances 212 rely on infrastructure provided by the cluster (e.g., cluster transaction manager 230) to consistently implement SCSI semantics in each cluster node 102.

Figure 10:
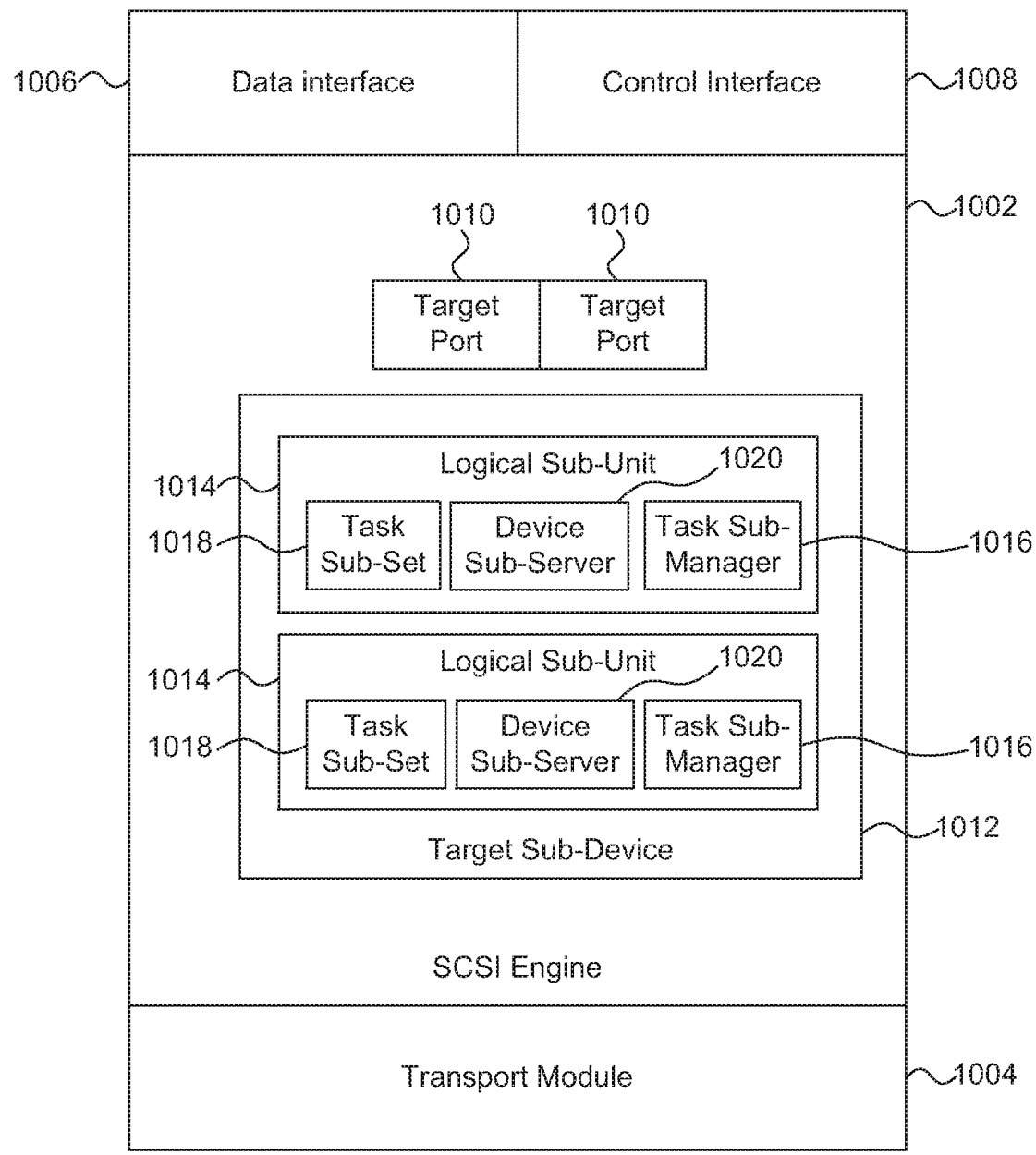
FIG. 10 shows an example block diagram of the components of a SCSI target in an S-module of a cluster node.

FIG. 10 is a block diagram of the components of a SCSI target 212 in the S-module 202 of a cluster node 102 according to one embodiment. The SCSI target 212 includes a SCSI engine 1002, a transport module 1004, a data interface 1006, and a control interface 1008. The SCSI engine can instantiate one or more logical target ports 1010, one or more target sub-devices 1012 including logical sub-units 1014, and one or more device sub-servers 1020. The elements of the SCSI target 212 can be implemented by programmable circuitry programmed or configured by software and/or firmware, or it can be implemented entirely by special-purpose "hardwired" circuitry, or in a combination of such forms.

The SCSI engine 1002 is the core functional block of a SCSI target instance 212 and implements, among other things, SCSI objects such as the target ports 1010, the SCSI target sub-device(s) 1012, and logical sub-unit(s) 1014. The SCSI engine 1002 performs SCSI protocol processing functions such as, for example, parsing/validating command descriptor blocks and parameter data, implementing a generic SCSI task state machine, defining SCSI objects, formatting response data, and selecting response and error codes based on host profiles.

As described above, a target device is a distributed object that includes a set of target sub-devices 1012 hosted on one or more nodes 102 in the cluster. The target device is a representation of a storage server that stores and serves data to one or more host systems. In one embodiment, the target device corresponds to a virtual server, where there can be multiple virtual servers that share a single set of physical resources. The target device is distributed as the set of target sub-devices 1012 such that a host accessing the system on any given node sees a consistent view of the target device. The target sub-devices 1012 on each node 102 coordinate operations using the cluster transaction manager 230, for example, to maintain consistent context information. This process is described in more detail below with reference to FIG. 4.

Each target sub-device 1012 is multi-protocol capable (i.e., supports FCP, iSCSI or any other SCSI transport protocol). To that end, each target sub-device 1012 is identified to the host 106 based on multiple protocols. For example, for a host accessing the cluster based on Fibre Channel Protocol (FCP) the target sub-device 1012 is identified by a World-Wide Node Name (WWNN), whereas for a host accessing the cluster based on iSCSI the target sub-device 1012 is identified by an iSCSI Target Node Name (e.g., an iSCSI Qualified Name (IQN)). In one embodiment, the target sub-device 1012 is also identified by a protocol agnostic identifier.

Each target sub-device 1012 is associated with a set of logical target ports 1010 and contains one or more logical sub-units 1014. In one embodiment, similar to the SCSI target 212 and the target sub-device 1012, one or more nodes 102 of the cluster can each host a logical sub-unit 1014, where the logical sub-units collectively make up a logical unit. The logical sub-units 1014 share global context information (e.g., state and configuration information) associated with the logical unit. The logical sub-units 1014 are each associated with a task sub-manager 1016 that coordinates state and configuration changes by using the cluster transaction manager 230 to distribute changes, requested at one logical sub-unit 1014, to the remaining logical sub-units that make up the distributed logical unit. The distributed logical unit is a representation of physical storage, or an abstraction of physical storage such as a volume, on which data in the cluster is stored. A collection of logical sub-units distributed across multiple cluster nodes can be identified to a host 106 by the same globally unique logical unit identifier for purposes of access by the host 106.

SCSI initiators, e.g., host 106, access logical sub-units via logical target ports 1010. In one embodiment, multiple logical target ports 1010 can reference a single physical port on the same node. Logical target ports 1010 are associated with a physical port when the transport module 1004, in response to a command from the management module 206, associates the identifier for the logical target port (i.e., transport protocol dependent and transport protocol independent identifiers) with a physical port on the node. The transport module 1004 registers the logical target port information with the SCSI target 212 which then instantiates the logical target port 1010. The transport module 1004 can then advertise the logical port 1010 in the SAN 110 (e.g., via Fibre Channel Fabric Login or during iSCSI discovery) which enables the host 106 to discover and connect to the logical port 1010.

The primary function of the logical target ports 1010 is to provide routing for commands and/or task management functions from the host 106 to the appropriate logical sub-unit 1014. To this end, logical target ports 1010 provide a point of access for the target sub-device 1012. Each target sub-device 1012 is associated with a separate set of logical target ports 1010. Each logical target port 1010 of the set is identified by a transport protocol dependent identifier (e.g., WWPN or IQN+TPG Tag) and a transport protocol independent relative target port identifier (RTP Id). The logical target ports 1010 are used by the SCSI engine 1002 to interface with FCP and iSCSI transport modules using the transport module 1004. In one embodiment, the transport interface 1004 is implemented as an API.

Data interface 1006 is used by the SCSI engine 1002 to send read/write operations to the storage manager 222 in the D-module 204 that hosts the physical storage where the read/write operation is to take place. Data interface 1006 translates the operations requested by the SCSI engine 1002 to the format used by the cluster interface 216 and notifies the cluster interface of the operation destination (i.e., the specific D-module that hosts the physical storage). The data interface 1006 also receives completion/error messages from the D-module 204. The data interface 1006 can then forward the completion/error messages to the SCSI engine 1002 to determine the next steps for the read/write operation.

The control interface 1008 is used by the SCSI engine 1002 to synchronize execution of SCSI semantics with corresponding SCSI engines in other cluster nodes 102. As briefly described above, each logical sub-unit 1014 is associated a task sub-manager 1016 to sequence and process commands and task management requests. An example of a task management request is LOGICAL UNIT RESET, which resets a logical unit to its initial power on state (i.e., discards all state information and disposes all queued commands without executing them). A task management request is received at one logical sub-unit but may need to be processed by all logical sub-units that collectively make up the single distributed logical unit. The device sub-server 1020 coordinates processing of commands and task management functions the need to be processed by each of the logical sub-units, such that the context information remains consistent between the logical sub-units as discussed further with respect to FIG. 12.

The control interface 1008 allows the task sub-manager 1016 to communicate over the cluster interface 216 with the cluster transaction manager 230. Specifically, the control interface 1008 maps requests for distributed operations from the SCSI engine 1002 into transactions distributed to other instances of the distributed logical unit by the cluster transaction manager 230. The task sub-manager 1016 uses the control interface 1008 to synchronize a set of tasks in the task sub-set 1018 that affect the context information maintained by the logical sub-unit 1014. This enables each task sub-manager 1016 associated with a logical unit to have a representation of a single global task set. The process of maintaining consistent context information is described in more detail below with reference to FIG. 12.

Figure 11:
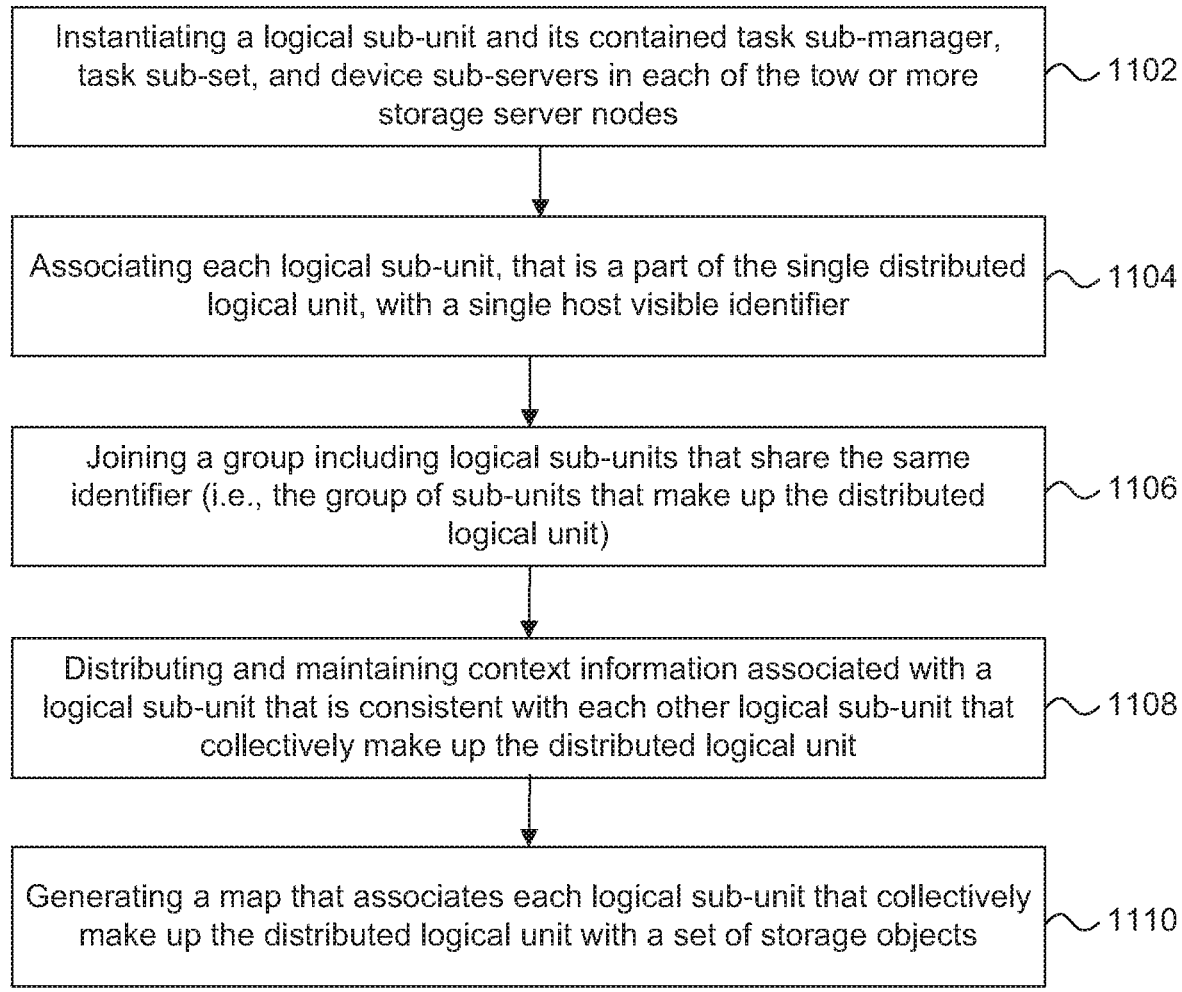
FIG. 11 is a flow diagram of a process for implementing a distributed logical unit in a clustered storage system in a SAN environment.
Figure 12:
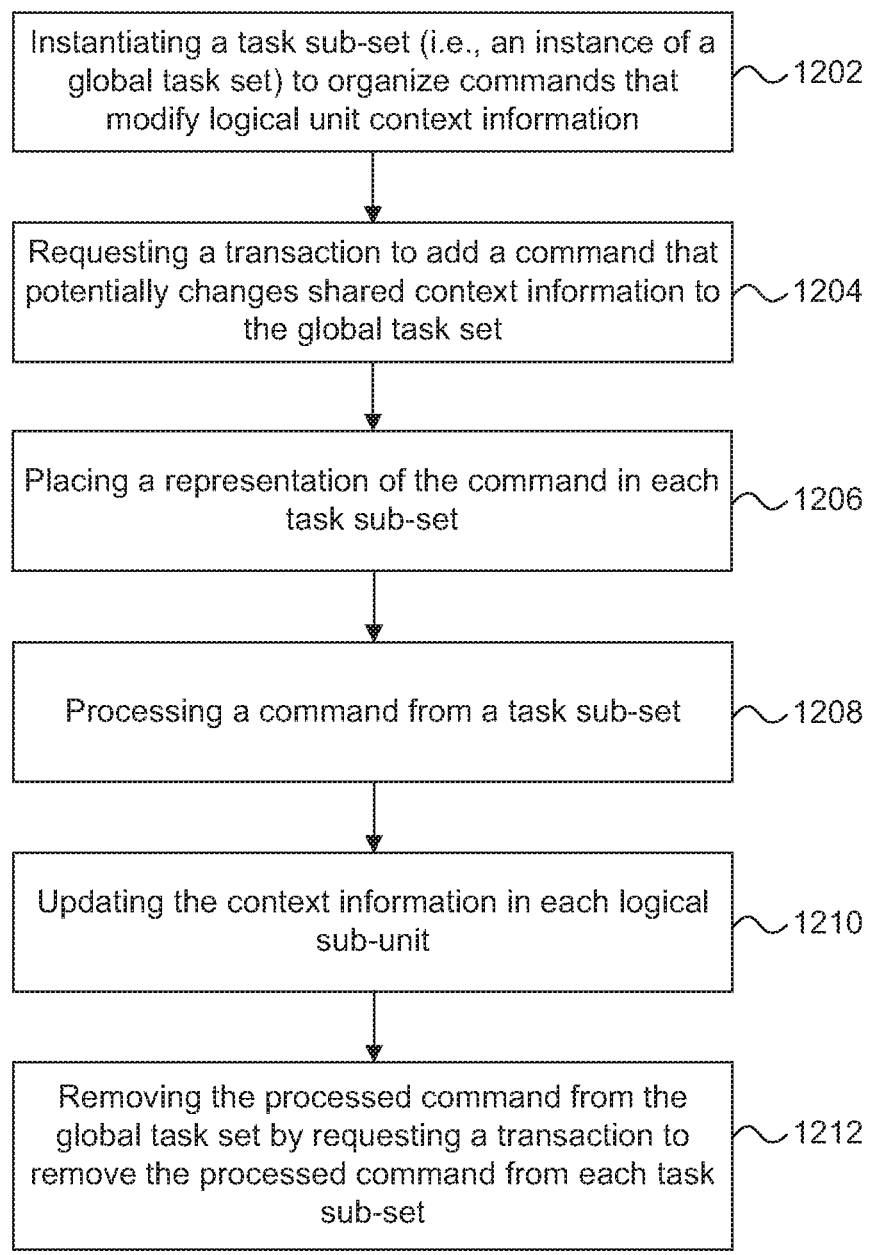
FIG. 12 is a flow diagram of a process for maintaining consistent context information between logical sub-units of a distributed logical unit.

FIG. 11 is a flow diagram of a process for implementing a distributed logical unit in a SAN-attached clustered storage system. The processes described in FIGS. 11 and 12 are organized as sequences of operations in the flowcharts. However, it should be understood that at least some of the operations associated with these processes potentially can be reordered, supplemented, or substituted for, while still performing the same overall technique.

As described above, the cluster presents a single system view of a distributed logical unit to the host, such that access to a particular logical sub-unit of the distributed logical unit is transparent to the host. In other words, the host is not aware of the existence of the logical sub-units and it appears to the host that the host is accessing a singular logical unit rather than a distributed logical unit. In one embodiment, at step 1102, the S-module 202 of each cluster node 102 instantiates a logical sub-unit 1014 associated with a target sub-device 1012. The logical unit 1014 includes the task sub-manager 1016, the task sub-set 1018, and device sub-server 1020. In one embodiment, the S-module on only a subset of the cluster nodes instantiates a logical-sub unit such that there may be some nodes in the cluster that do not include a target sub-device or a logical sub-unit associated with that target sub-device.

At step 1104, the SCSI target 212 of the S-module 202 associates each logical sub-unit, that is part of the single distributed logical unit, with a single host visible identifier. Thus, each logical sub-unit is identified with a single identifier such that the logical sub-units are not visible to the host a separate entities from the single distributed logical unit.

At step 1106, each logical sub-unit joins a group that includes logical sub-units that share the same host visible identifier. As described above, a cluster transaction manager 230 coordinates communication across the cluster, for example, to enable a logical sub-unit to join a group. The cluster transaction manager 230 enables each logical sub-unit having the same host visible identifier to join a common group and communicate with each other logical sub-unit in the group by coordinating the distribution of proposals to each member of the group.

At step 1108, the S-module distributes and maintains context information for each logical sub-unit 1014 that is consistent with corresponding context information of each other logical sub unit such that the logical sub-units collectively make up a single distributed logical unit. The process for maintaining the context information is described in more detail below with reference to FIG. 5. At step 1110, the S-module 202 in each node that includes a logical sub-unit generates a map that associates each logical sub-unit 1014 that collectively make up the distributed logical unit with a set of storage objects that are associated with the distributed logical unit. In one embodiment, the map is a database that associates a LUN, or some other storage object identifier, with each logical sub-unit.

As described above, in order to maintain a consistent view of a distributed logical unit across all of the nodes in a cluster, SCSI target 212 maintains context information for each logical sub-unit that is consistent with the corresponding context information for each of the other logical sub-units. SCSI target 212 can maintain the context information in a data structure in memory, for example. Such context information can include, for example, a data access state (e.g., connected/not-connected), an administrative state (e.g., enabled/disabled), a SCSI reservation state and/or type, a power condition state (e.g., active, idle, standby, stopped, etc.), logical unit configuration (e.g., a logical unit identifier such as a LUN Serial Number, block size, geometry, ALUA/non-ALUA personality, etc.), and/or logical unit metadata such as mode pages that advertise a specific logical unit behavior to the host and log pages that export various statistics associated with the logical unit to the host. The context information can be modified as a result of processing commands, for example, SCSI commands or calls made to APIs exposed by the SCSI target 212. Execution of these commands can is synchronized on each node of the cluster using the cluster transaction manager 230 as described in more detail below.

FIG. 12 is a flow diagram of a process for maintaining consistent context information between logical sub-units of a distributed logical unit. At step 1202, the task sub-manager 1016 of each logical sub-unit 1014 instantiates an instance of a global task set (i.e., task sub-set 1018), to organize any commands that will modify the context information. In order to maintain the consistency of the context information, commands that modify the context information are performed in the order that they appear in the global task set. The consistency of each task sub-set 1018 is maintained by using the cluster transaction manager 230 to coordinate when, and in what order, a command can be placed in the global task set.

For each command in the global task set, the task sub-manager 1016 that proposed the transaction to place the command in the global task set can be considered the master task sub-manager. The master task sub-manager is responsible for requesting that the command be placed in the task set and, when the command has reached the top of the queue and is processed, notifying the other task sub-managers that the command has been processed.

At 1204, the master transaction sub-manager requests a transaction by calling a proposal API exposed by the cluster transaction manager 230. The cluster transaction manager 230 forwards the request to the GC, which serializes transaction requests such that a consistent task sub-set 1018 is maintained by each task sub-manager. If there are no other transaction requests processing, the GC forwards the request to each of the GMs associated with each of the task sub-managers and informs the task sub-managers to add the request to the corresponding task sub-set 1018. Then, at step 1206, each task sub-manager adds the command to the task sub-set in the order in which they are received by the GC, such that each instance of the global task set remains consistent.

At step 1208, when the command requested by the master task sub-manager reaches the top of the queue, the master task sub-manager initiates processing of the command. When the command has been processed, at step 1210, the master task sub-manager initiates a transaction using the cluster transaction manager 230 to update the context information maintained for each logical sub-unit. In response to receiving a confirmation from each SCSI target 212 that the context information has been updated, at step 1212, the master task sub-manager removes the command from the task sub-set and requests a transaction to remove the processed command from each other task sub-set in the cluster so that the next command can be processed.

Because of the distributed architecture of the SAN-attached clustered storage system, it can be difficult to maintain consistency between the cluster nodes. However, it is important to maintain consistency between the nodes so that each instance of the distributed system appears the same to the host. Maintaining consistency between the cluster nodes becomes more difficult, if not impossible, when some of the nodes in the cluster are not able to communicate with other nodes in the cluster. In a situation where a portion of the cluster nodes are isolated from the others, the cluster quorum managers 232 in the various cluster nodes can determine which collection of cluster nodes has quorum and implement techniques to fence the remaining nodes from the cluster so that consistency is maintained. "Quorum," as used herein, means a collection of connected, active, and available nodes in the cluster that can adequately perform normal operations of the cluster. The process of determining quorum, as described below in more detail, includes determining which collection of nodes (if there is more than one) should continue operation as the storage system and provide services to the host.

As described briefly above, the cluster quorum manager 232 relies on the cluster transaction manager 230 to monitor each of the cluster nodes. The cluster quorum manager 232 does this by using the cluster transaction manager 230 to conduct transactions between each of the cluster nodes. As described above, the cluster transaction manager 230 isolates transactions to members of a group. The cluster quorum manager of each node 102 of a cluster is a member of a Configured Cluster Nodes (CCN) group, for example. When a cluster node joins or leaves the cluster it is added or removed from the CCN group. The cluster quorum manager 232 uses transactions between the members of the CCN group to monitor whether a cluster node is active and/or available in the cluster. In one embodiment, each cluster quorum manager 232 in the cluster maintains a consistent list of the members of the CCN group and the active and available nodes in the cluster. In one embodiment, each node in the cluster is identified by a unique node ID, and the cluster quorum manager on the node with the lowest node ID is designated as the master cluster quorum manager ("master"). While the example of using the lowest node ID to determine the master cluster quorum manager is used in this description, it is understood that any one of a number of unique identifiers and/or processes can be used to select the master cluster quorum manager. The master cluster quorum manager is responsible for originating a heartbeat proposal to each of the other cluster quorum managers in the CCN group and coordinating communication of other cluster quorum information between members of the CCN group.

The cluster transaction managers 230 maintain a group member (GM) abstraction (e.g., a finite state machine instantiated by the cluster transaction manager) of each cluster quorum manager 232 in the cluster to facilitate the processing of transactions between the cluster quorum managers. The GMs communicate via proposals transmitted to other GMs of the same group. The cluster transaction manager 232 exposes APIs, or provides some communication method, for the cluster quorum manager 232 to initiate proposals to the other GMs. One of the GMs is designated a group coordinator (GC). The GC coordinates the distribution of proposals to each of the GMs and the collection of responses to those proposals.

Among other proposals, three types of proposals are used for communications between cluster quorum managers. These three types of proposals are described in more detail below with reference to FIGS. 13 and 16. The first proposal is a heartbeat proposal to determine which nodes of the cluster are active and able to communicate with the master. The master originates the heartbeat proposal, which is sent to each cluster quorum manager that is a member of the CCN group.

A second type of proposal originated by the master is a quorum status message proposal. The master can originate the quorum status message proposal in response to an event that relates to the quorum. For example, the master can originate a quorum status message after it has evaluated which nodes are active and available in the cluster, in response to a change in the nodes that make up the cluster, or in response to a reconfiguration of storage resources due to failure of a node. The quorum status message is sent to all cluster quorum managers that are members of the CCN group.

Another type of proposal used for communication between the cluster quorum managers is a cluster change notification. Any cluster quorum manager can originate the cluster change notification. A cluster quorum manager may originate the cluster change notification in response to receiving notification from another cluster subsystem that there has been a change in the configuration of the cluster, for example, due to the failure of a cluster node. This notification message is sent to all cluster quorum managers in the CCN group.

Figure 13:
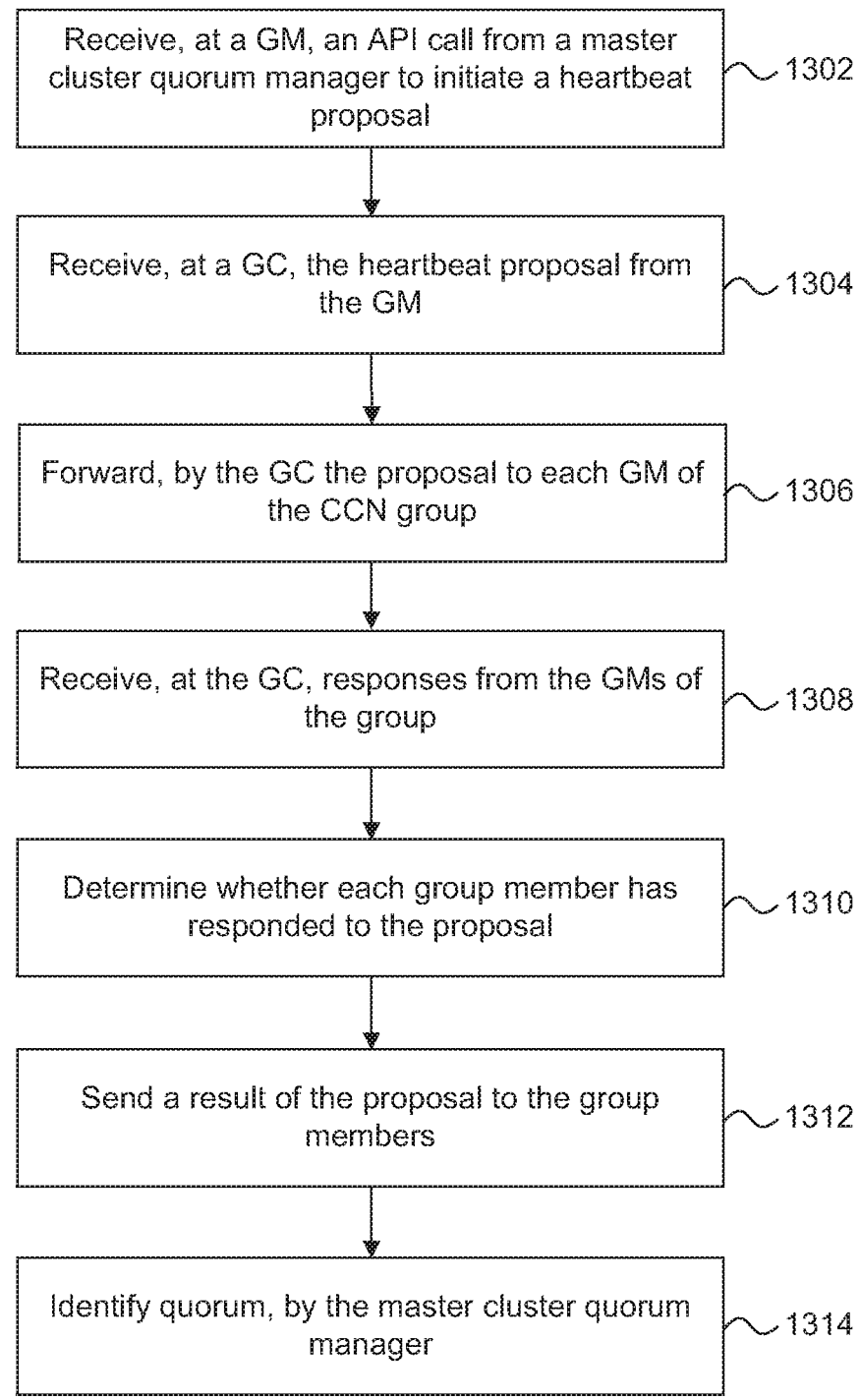
FIG. 13 is a flow diagram of a process for coordinating and performing a heartbeat proposal in a SAN-attached clustered storage system.

FIG. 13 is a flow diagram of a process for coordinating and performing a heartbeat proposal in a SAN-attached clustered storage system. The processes described herein are organized as a sequence of operations in the flowcharts. However, it should be understood that at least some of the operations associated with these processes potentially can be reordered, supplemented, or substituted for, while still performing the same overall technique.

As described above, the cluster transaction manager 230 coordinates communication across the cluster. For example, the cluster quorum manager 232, as a cluster transaction manager client, can originate a proposal such as the heartbeat proposal briefly described above. In one embodiment, assuming the cluster quorum manager 232 is the master, the cluster quorum manager 232 can originate the heartbeat proposal by calling a voting proposal API exposed by the cluster transaction manager 230. Other methods of communication known in the art can be used to replace the API call used in this description.

At step 1302, the GM associated with the cluster quorum manager 232 receives a communication from the cluster quorum manager 232 to initiate a heartbeat proposal. In one embodiment, the communication is an API call for a voting proposal, for example, a heartbeat proposal. The API call includes, among other things, the most recent list of nodes that belong to the CCN group and an indication of the master's compatibility with other versions. As described above, multiple proposals that are to be processed in a single transaction can be received from the client; however, to facilitate description, it is assumed that a single proposal is received. The GM looks up the location of the GC, from the GM's local record, and forwards the heartbeat proposal to the GC. At step 1304, the GC receives the heartbeat proposal from the GM. Because the heartbeat proposal is an unserialized proposal, the GC, at step 1306, forwards the proposal to each GM of the group without regard to whether other proposal are currently processing.

Each GM in the group receives the proposal from the GC and presents the proposal to its corresponding cluster quorum manager using a client callback function. The cluster quorum manager responds to the GM, through a Respond API, with an indication that the cluster quorum manager either accepts or rejects the proposal and an indication of the cluster quorum manager's operating version. For example, a cluster quorum manager may reject the proposal if the recipient cluster quorum manager is aware of anomalies affecting functionality in the local node, thereby indicating the local node is in poor health. The GM then forwards the response to the GC which, at step 1308, receives the responses from each GM. At step 1310, the GC determines whether each GM has responded to the proposal before a timeout period for response has expired.

At step 1312, the GC packages the responses into a result message that it distributes to each GM. At step 1314, in response to receiving the result, a cluster quorum manager, that is not the master, indicates to the GM that the result has been received. The master, at step 1314, uses the responses to identify the collection of cluster nodes that constitute quorum in the cluster. The process of identifying quorum is described in more detail below with reference to FIGS. 14 and 15.

Figure 14:
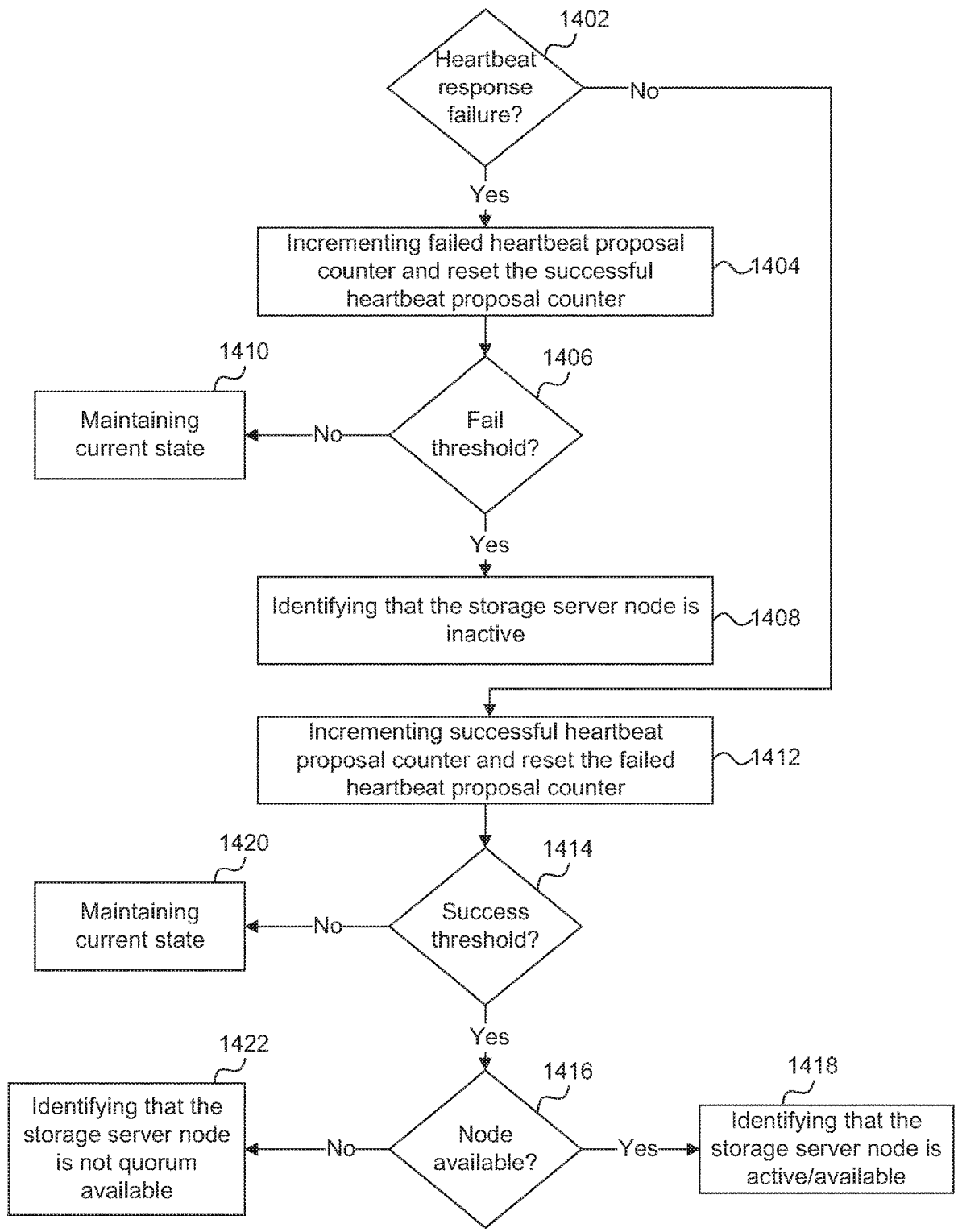
FIG. 14 is a flow diagram of a process determining whether a node is considered active in a SAN-attached clustered storage system.
Figure 15:
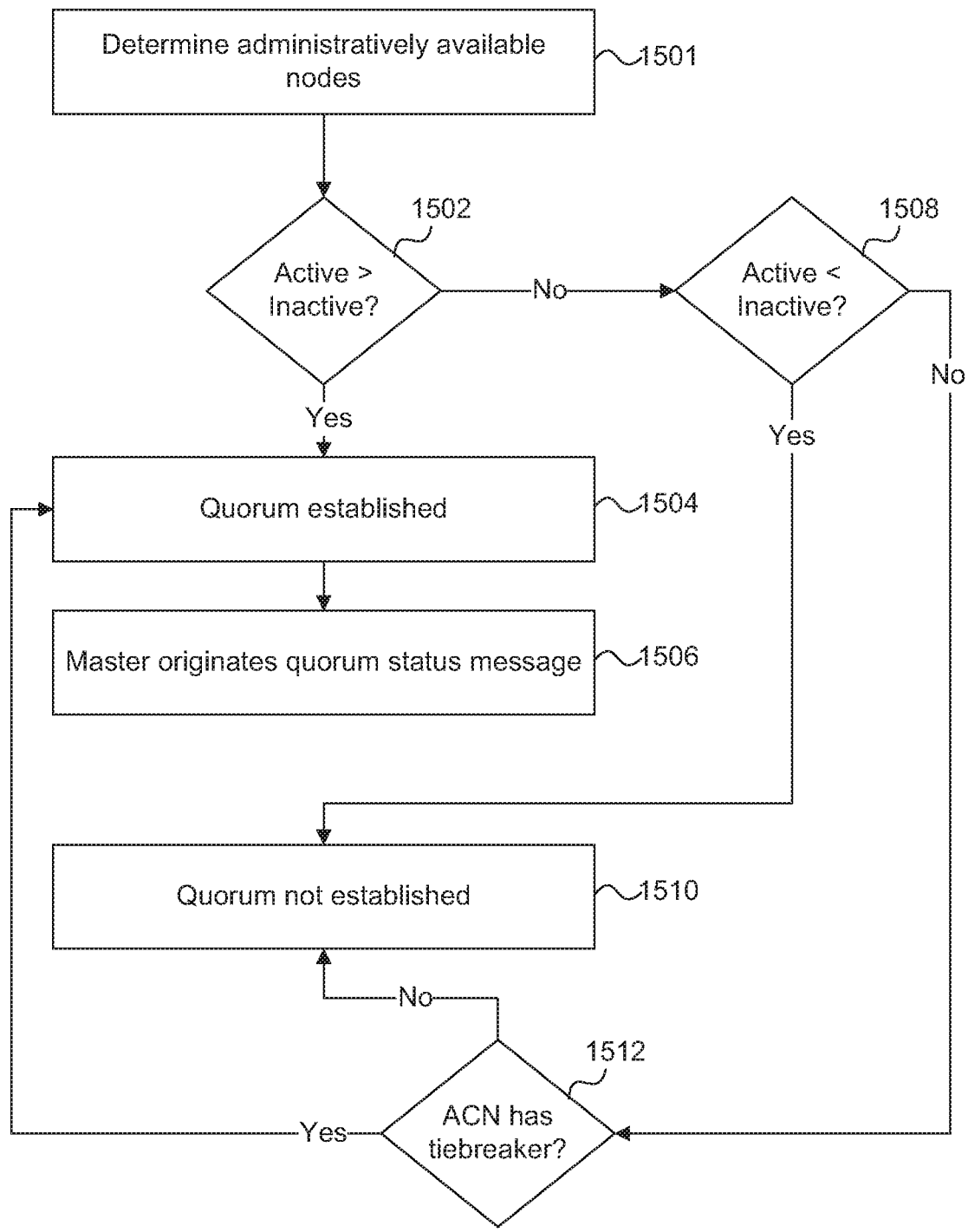
FIG. 15 is a flow diagram of a process for determining whether a collection of active and available cluster nodes constitute a quorum in a SAN-attached clustered storage system.

FIGS. 14 and 15 collectively show a process for identifying quorum in a SAN-attached clustered storage system. As briefly described above, a quorum is a collection of active and available cluster nodes that can continue normal operation of the cluster. The master cluster quorum manager determines quorum based on the results of a heartbeat proposal. The process of determining quorum can be divided into essentially two parts: First, identifying a collection of active cluster nodes (i.e., nodes that are connected and can communicate) and second, determining that the collection of active nodes is available to perform the normal operations of the cluster.

FIG. 14 is a flow diagram of a process for determining whether a node is considered active in a SAN-attached clustered storage system such as represented in FIG. 1. The result of the process depicted in FIG. 14 is a list of the active cluster nodes (ACN). The process of identifying active cluster nodes is initiated in response to the master receiving the results of a heartbeat proposal. The process takes place for each node in the CCN group that was included in the heartbeat proposal. While the flow chart of FIG. 14 shows the process for determining the active/inactive status of a single cluster node, it is to be understood that the process is performed for each node that is included in the CCN group. At step 1402, the master cluster quorum manager determines whether the cluster quorum manager of a node failed to accept the heartbeat proposal and return a result or failed to respond completely.

The master cluster quorum manager maintains a data structure (or multiple data structures) that includes counters that track the number of failed heartbeat proposal responses and the number of successful heartbeat proposal responses by each cluster quorum manager. If another cluster quorum manager returns a failed heartbeat proposal response to the master cluster quorum manager, at step 1404, the master cluster quorum manager increments the failed heartbeat proposal counter and resets the successful heartbeat proposal counter that corresponds to that cluster quorum manager. The master cluster quorum manager then determines, at step 1406, whether the failed heartbeat proposal counter has reached a predetermined threshold.

If the failed heartbeat proposal has reached the predetermined threshold, at step 1408 the master cluster quorum manager determines that the cluster node is not active and removes the node from the ACN group. If the failed heartbeat proposal has not reached the determined threshold, at step 1410 the master cluster quorum manager does not change the active/inactive status of the cluster node. The process of maintaining a counter for determining whether a cluster node has become active/inactive can smooth over changes to the cluster quorum that may be attributed to minor, transient, or temporary communication errors, etc.

Returning to step 1402, if the cluster quorum manager returns a successful heartbeat proposal response, at step 1412 the master cluster quorum manager increments the successful heartbeat proposal counter and resets the failed heartbeat proposal counter. The master cluster quorum manager then determines, at step 1414, whether the successful heartbeat proposal counter has reached a predetermined threshold. If the successful heartbeat proposal has not reached the predetermined threshold, at step 1420 the master cluster quorum manager does not change the status of the cluster node.

If the successful heartbeat proposal has reached the predetermined threshold, at step 1416 the master cluster quorum manager determines whether the cluster node is available to be included in the quorum. A cluster node can be unavailable for any of a number of reasons. For example, if a cluster node is marked unavailable by an administrator, the cluster node will not be available to be included in quorum calculations. Similarly, if a cluster node is being taken over by its fail over partner, but for some reason is still active in the cluster, the cluster node will not be available to be included in the quorum. Further, if the cluster node is a product version that is not compatible with the master cluster quorum manager node, the cluster node is not available to be included in the quorum.

If the master cluster quorum manager determines that the cluster node is available, at step 1418 the cluster node is included in the ACN group and is included in determining cluster quorum. If the master cluster quorum manager determines that the cluster node is not available, at step 1422 the cluster node is included in the ACN group but is not included in determining cluster quorum.

FIG. 15 is a flow diagram of a process for determining whether a collection of active and available cluster nodes constitute a quorum in a SAN-attached clustered storage system. The process depicted in FIG. 15 is performed by the master cluster quorum manager after identifying which cluster nodes are active and available.

The process begins at step 1501, where the master quorum manager determines which cluster nodes are administratively available in the cluster as described above with reference to FIG. 14. In one embodiment, only the administratively available nodes are used in determining quorum. At step 1502 the master cluster quorum manager determines whether the number of active nodes is greater than the inactive nodes in the cluster. If the number of active nodes is greater than the number of inactive nodes (i.e., the active nodes are a majority), then at step 1504 the master cluster quorum manager determines that quorum is established and that the active cluster nodes are included in the quorum. In response to determining that quorum is established, at step 1506 the master cluster quorum manager originates a message proposal to each of the other cluster quorum managers indicating the quorum status. The message proposal is described in detail below with reference to FIG. 16.

If, at step 1502, the master cluster quorum manager determines that the number of active nodes is not greater than the inactive nodes, at step 1508 the master cluster quorum manager determines whether the number of active nodes is less than the inactive nodes in the cluster. If the master cluster quorum manager determines that the number of active nodes is less than the number of inactive nodes in the cluster, then at step 1510 the master cluster quorum manager determines that quorum has not been established (i.e., the master cluster quorum manager is out-of-quorum). Because the master cluster quorum manager is out-of-quorum, a cluster quorum manager that is in-quorum can take over the mastership and begin to originate heartbeat proposals. Later, if the inactive nodes rejoin the cluster, the master cluster quorum manager is determined as described below.

If, at step 1508, the master cluster quorum manager determines that the number of active nodes is not less than the number of inactive nodes (i.e., the cluster is split with the number of active nodes is equal to the number of inactive nodes), at step 1512 the master cluster quorum manager determines whether one of the active nodes includes the tie-breaker attribute. A tie-breaker attribute is an administrator configured attribute of no more than one node in the cluster. For example, the cluster administrator initially assigns this attribute to one of the nodes. In one embodiment, the attribute may be automatically re-assigned to another node, such as if the node originally assigned to has been taken over.

If the master cluster quorum manager determines that an active cluster node includes the tie-breaker attribute, at step 1504 the master cluster quorum manager determines that quorum is established and that the active cluster nodes are included in the quorum. In response to determining that quorum is established, at step 1506 the master cluster quorum manager originates a proposal to each of the cluster quorum managers indicating the quorum status. If the master cluster quorum manager determines that an active cluster node does not include the tie-breaker attribute, at step 1510 the master cluster quorum manager determines that quorum has not been established (i.e., the master cluster quorum manager is out-of-quorum). Because the master cluster quorum manager is out-of-quorum, a cluster quorum manager that is in-quorum can take over the mastership and begin to originate heartbeat proposals to the other in-quorum nodes. Similarly, the cluster quorum manager on one of the out-of-quorum nodes would emerge as the master cluster quorum manager for the out-of-quorum cluster partition and exchange heartbeats among the nodes in that partition.

As described briefly above, in one embodiment, it is possible for the cluster quorum manager in any cluster node to become the master cluster quorum manager. For example, if the node that hosts the master cluster quorum manager can no longer communicate with the other nodes in the cluster, the mastership will be shifted to another cluster quorum manager in the cluster. In one embodiment, if the master cluster quorum manager determines that another cluster quorum manager has a higher product version number than itself, for example, during the heartbeat proposal process, the master cluster quorum manager relinquishes its mastership to the cluster quorum manager in the higher product version node. Further, in one embodiment, the cluster can automatically correct the situation where there may be more than one cluster quorum manager acting as the master cluster quorum manager at a time by using the specified hierarchical order to determine which cluster node takes precedence.

To facilitate quick selection of the master cluster quorum manager in a case like one of those described above, an automatic master cluster quorum manager evaluation system is put in place. The list of nodes in each cluster, the CCN list, maintained by each cluster quorum manager includes the nodes in an order by which they are to be selected as the master cluster quorum manager. For example, in one embodiment, the nodes in the CCN list may be listed in order from lowest to highest node ID. The lowest node ID may be initially designated as the master cluster quorum manager.

In one embodiment, to determine which node will take over as master cluster quorum manager and when that will happen, each cluster quorum manager maintains a timer. Each cluster quorum manager also has a unique threshold time after which, if a heartbeat proposal has not been received from the master cluster quorum manager, that cluster quorum manager will take over as master cluster quorum manager and originate a heartbeat proposal. The timer is reset every time the cluster quorum manager receives a heartbeat proposal from the master cluster quorum manager. In one embodiment, the timer threshold can be a function of the node ID or some other unique identifier. Thus, the cluster will not be without a master cluster quorum manager for a sustained period of time.

In one embodiment, if the master cluster quorum manager receives a heartbeat proposal from another cluster quorum manager holding itself out to be the master cluster quorum manager, the master cluster quorum manager checks the node ID, or some other unique identifier, and determines whether it should continue as the master cluster quorum manager or defer to the proposing cluster quorum manager. In the case where the node ID is used to determine the master cluster quorum manager, the master cluster quorum manager will defer to the proposing cluster quorum manager if, for example, the master cluster quorum manager has a higher node ID than the proposing cluster quorum manager.

Figure 16:
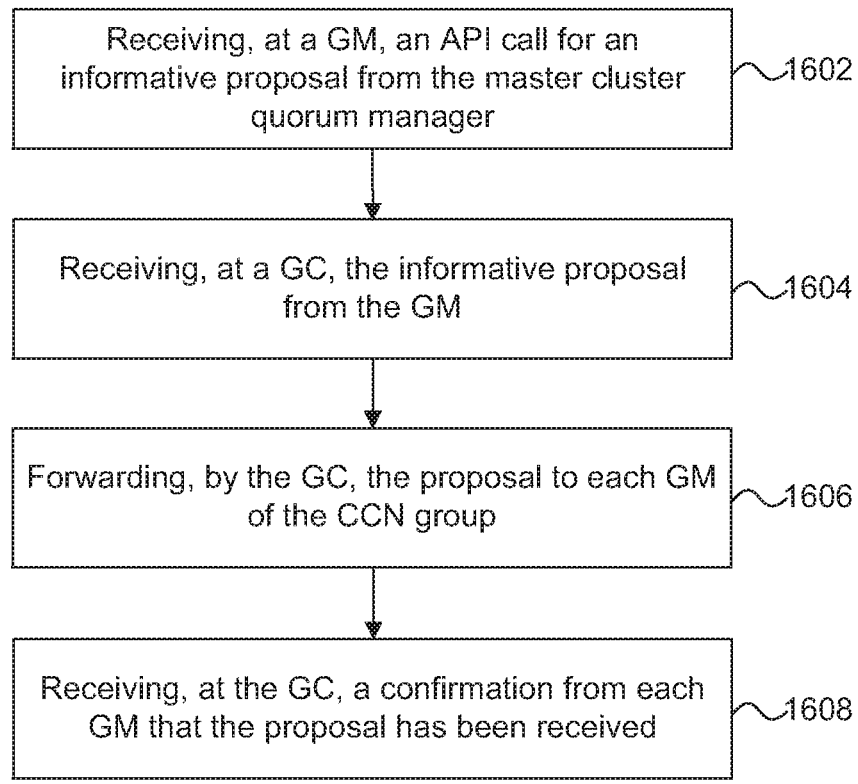
FIG. 16 is a flow diagram of a process for coordinating an informative proposal in a SAN-attached clustered storage system.

FIG. 16 is a flow diagram of a process for coordinating an informative proposal in a SAN-attached clustered storage system. An informative proposal can be, for example, a quorum status message, as briefly discussed above, sent to each of the cluster nodes in the CCN group. As described above, the cluster transaction manager is used to process the proposal.

At step 1602, the GM associated with the master cluster quorum manager receives, from the master cluster quorum manager, an API call for an informative proposal. For example, the API call can include a quorum status message that is to be communicated to each member of the CCN group. The quorum status message can include, among other things, a list of the currently active nodes and whether each node is in-quorum or out-of-quorum. The quorum status message can also include the version of each active cluster quorum manager.

The GM associated with the master cluster quorum manager looks up the location of the GC, from the GM's local record, and forwards the informative proposal to the GC. At step 1604, the GC receives the proposal from the GM and, at step 1606, forwards the proposal to each GM of the CCN group. In one embodiment, the informative proposal can be a guaranteed informative proposal, meaning that the GC requests a receipt message from each of the GMs in the group. At step 1608 the GC receives the receipt message from each of member of the group. In one embodiment, the master cluster quorum manager attempts to originate the proposal again, if any of the in-quorum nodes do not acknowledge receipt of the quorum status message. In another embodiment, the master cluster quorum manager periodically sends the most recent cluster quorum status proposal to all the nodes in the CCN group, which is compared with the local record and updated accordingly whereby any nodes that have not received it previously are now consistent with the master.

The informative proposal process described above with reference to FIG. 16 can also be used by a non-master cluster quorum manager to share information regarding changes in the cluster that should remain consistent between the cluster quorum managers. For example, in one embodiment, each cluster quorum manager can subscribe to events that are published by other cluster subsystems. If, for example, a cluster quorum manager receives an update that the nodes that make up the CCN group have changed, the cluster quorum manager can use an informative proposal to share that information with other cluster quorum managers in the cluster.

As described above, one of the reasons for implementing a clustered storage architecture is to provide greater fault tolerance. For example, if a particular node can no longer serve data to the host, for any number of reasons, the storage that the node presented to the host can be taken over by a partner node which can serve the data to the host. In one embodiment, the cluster quorum managers in each of the nodes coordinate this takeover process. Further, because the proper function of the cluster includes presenting the host with a consistent view from each cluster node, the cluster quorum managers can cooperate to implement isolation techniques in the event a node fails. These techniques are described below with reference to FIG. 17.

Figure 17:
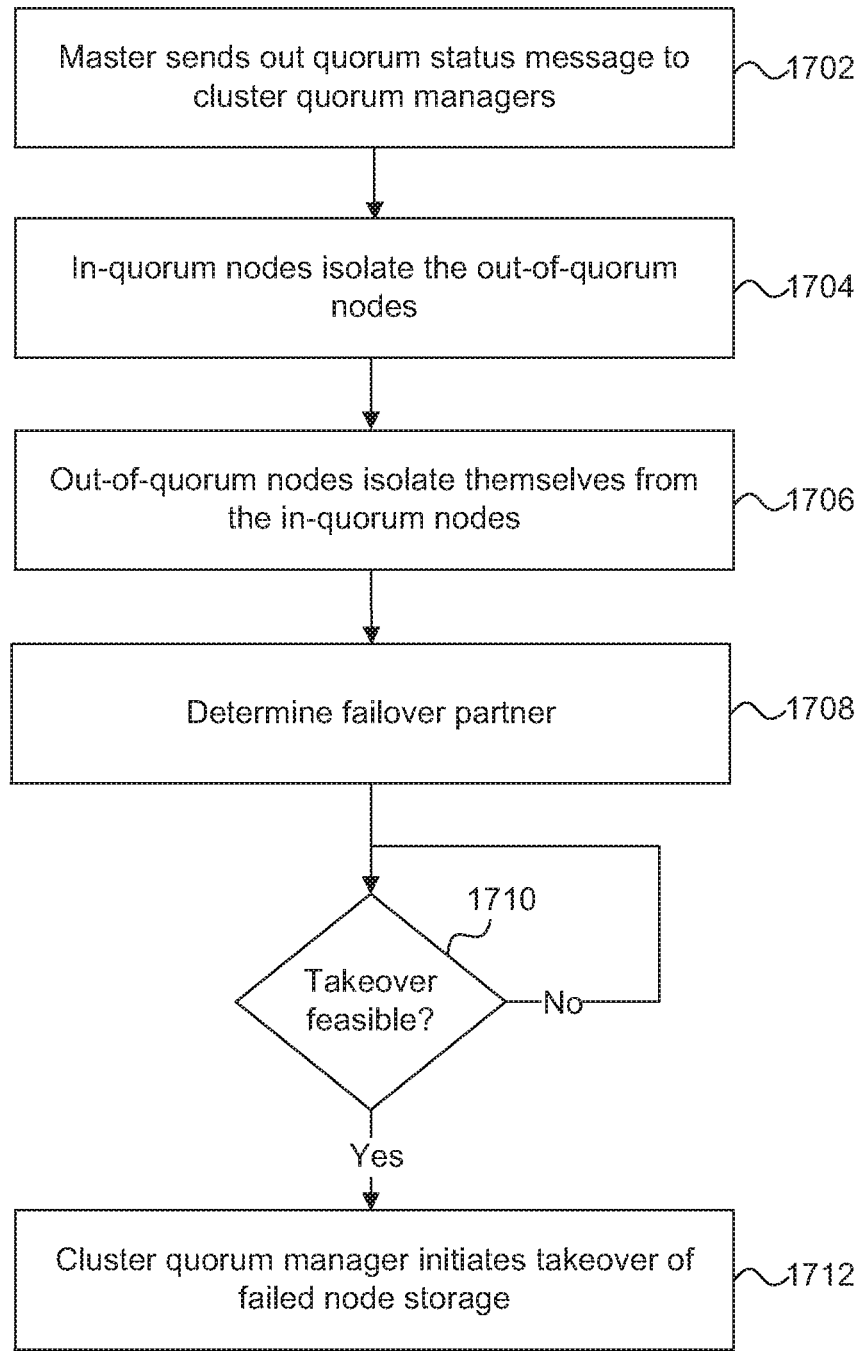
FIG. 17 is a flow diagram of a process for isolating and taking over the storage of an out-of-quorum node.

FIG. 17 is a flow diagram of a process for isolating and taking over the storage of an out-of-quorum node. The process is organized as a sequence of operations in the flowchart. However, it should be understood that at least some of the operations associated with this process potentially can be reordered, supplemented, or substituted for, while still performing the same overall technique.

At step 1702 the process of isolating a node that is no longer in-quorum and taking over that node's storage begins when the master cluster quorum manager sends out a quorum status message with a list of the nodes that are in-quorum or out-of-quorum. To facilitate description, assume a cluster with four nodes, A, B, C, and D. While a four node cluster is described here, it is understood that any number of cluster nodes can perform a similar process. Assume for this example that the quorum status message indicates that node C is out-of-quorum.

At step 1704, in response to receiving the quorum status message, and seeing that node C is out-of-quorum, the cluster quorum manager of each of the in-quorum nodes, A, B, and D, isolate themselves from node C. The cluster quorum managers do this by notifying the cluster transaction manager of their respective node that node C is out-of-quorum. The cluster transaction manager of each of the in-quorum nodes will ignore any future transaction requests from node C and will not include node C in any new proposals, until and unless node C comes back into quorum.

At step 1706, the cluster quorum manager of node C sees that its node is out-of-quorum and it isolates itself from the in-quorum nodes. Node C can realize that it is out of quorum in one of several ways. For example, if node C does not receive a heartbeat proposal within a threshold time (e.g., the master cluster quorum manager takeover timer as described above) and does not receive a response to its own proposed heartbeat, node C knows it no longer has reliable connectivity with the rest of the cluster. Similarly, node C can realize it is out-of-quorum even if node C does have connectivity to the rest of the cluster, for example, if node C is not included in the quorum status message as being in-quorum, for example, because it is an incompatible version. The cluster quorum manager isolates itself by notifying its corresponding cluster transaction manager that the node is out-of-quorum. The cluster transaction manager of node C, in response to receiving the notification that it is out-ofquorum, will no longer make cluster-wide proposals until and unless node C comes back into quorum. Thus, node C's isolation from the rest of the cluster is redundant (implemented by the cluster transaction manager of node C itself and by the cluster transaction managers of the remaining in-quorum nodes) to ensure that consistency of the in-quorum nodes is maintained. For example, if the operating system on node C is unresponsive, this redundancy protects the integrity of the rest of the cluster, by effectively quarantining node C from the other nodes without requiring node C's co-operation.

At step 1708, in response to determining that a node is out-of-quorum, the cluster quorum manager in one of the remaining nodes, assume for this example node D, determines that it is the storage failover partner for node C. In one embodiment, each node receives information regarding storage failover partners from a Storage Failover sub-system that determines the failover partners. However, any known method of determining failover partners can be used. The cluster quorum manager of the failover partner node, in this example node D, at step 1710 checks, for example, with a Storage Failover sub-system, to verify that a takeover of node C's storage is feasible. If the cluster quorum manager of node D determines that a takeover of node C is not feasible, then it will try to verify whether a takeover is feasible periodically or each time it receives a quorum status message indicating that node C is out-of-quorum. If the cluster quorum manager of node D determines that a takeover of node C's storage is feasible, at step 1712 the cluster quorum manager of node D initiates a takeover of node C's storage. The takeover process is not germane to this disclosure and can be performed according to any one of a number of known techniques.

Figure 18:
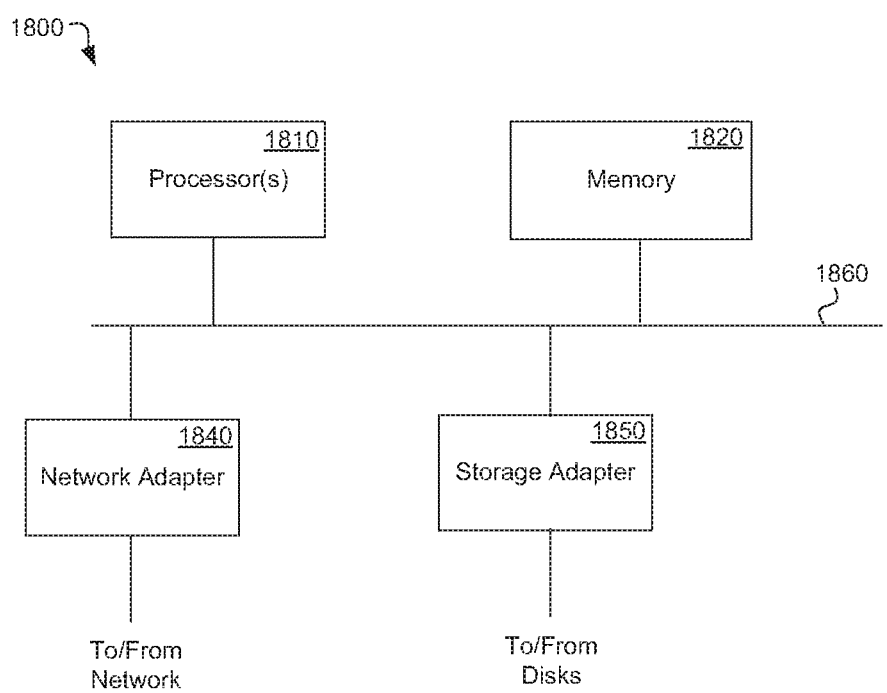
FIG. 18 is a block diagram of a system that can be used to implement one or more nodes of a clustered storage system in a SAN environment.

FIG. 18 is a block diagram of a system that can be used to implement components of a clustered storage area network. For example, the system of FIG. 18 can be used to implement a node (i.e., an S-module, a D-module, and/or a management module).

In an illustrative embodiment, the system 1800 includes a processor subsystem 1810 that includes one or more processors. The system 1800 further includes memory 1820, a network adapter 1840, and a storage adapter 1850, all interconnected by an interconnect 1860.

The memory 1820 illustratively comprises storage locations that are addressable by the processor(s) 1810 and adapters 1840 and 1850 for storing software program code and data associated with the techniques introduced here. The processor 1810 and adapters 1840 and 1850 may, in turn, comprise processing elements and/or logic circuitry configured to execute the software code and manipulate the data structures. It will be apparent to those skilled in the art that other processing and memory implementations, including various computer readable storage media, may be used for storing and executing program instructions pertaining to the techniques introduced here.

The network adapter 1840 includes a plurality of physical ports, such as a Fibre Channel or Ethernet port, to couple the system 1800 with one or more other systems over point-to-point links, wide area networks, virtual private networks implemented over a public network (Internet) or a shared local area network. The network adapter 1840 thus can include the mechanical components and electrical circuitry that allows the system 1800 to connect with the cluster interconnect and/or host. One or more systems can communicate with other systems over the by exchanging messages, for example, using packets or frames of data according to pre-defined protocols.

The storage adapter 1850 cooperates with the operating system to access information on attached storage devices. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. The storage adapter 1850 includes a plurality of ports having input/output (I/O) interface circuitry that couples with the disks over an I/O interconnect arrangement, such as a conventional high-performance, Fibre Channel (FC) link topology.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method comprising:
   storing a distributed logical unit across nodes of a computing environment, wherein the distributed logical unit comprises a plurality of logical sub-units and is exposed as a single entity to host devices;
   receiving a proposal to execute a transaction to modify a first logical sub-unit of the distributed logical unit from a requestor node, wherein the proposal comprises an identifier of the first logical sub-unit that will be modified;
   maintaining a list of locked identifiers corresponding to identifiers of logical sub-units of the plurality of logical sub-units of the distributed logical unit that are locked and are targeted for modification by pending transactions, wherein a locked identifier within the list of locked identifiers indicates that a corresponding logical sub-unit is locked, by a pending transaction that is to modify the logical sub-unit, from being modified by other transactions;

comparing the identifier to the list of locked identifiers to determine whether the identifier occurs within the list of locked identifiers;

in response to the identifier occurring within the list of locked identifiers, transmitting a busy indicator to the requestor node and queuing the proposal within a queue for a retry time period; and in response to the identifier not occurring within the list of locked identifiers, executing a multi-phase voting procedure amongst a set of nodes that are members of a group associated with the identifier, wherein the executing comprises receiving responses from the nodes within the set of nodes within the group, wherein a response indicates whether a node within the set of nodes accepts the proposal for execution of the transaction.

2. The method of claim 1, comprising: executing the transaction based upon the responses indicating that the nodes within the set of nodes unanimously accepted the proposal.

3. The method of claim 1, comprising: discarding the proposal to refrain from executing the transaction based upon the responses indicating that the nodes within the set of nodes did not unanimously accept the proposal.

4. The method of claim 1, comprising: executing the transaction based upon the responses indicating that greater than a threshold number of nodes within the set of nodes accepted the proposal.

5. The method of claim 1, comprising: discarding the proposal to refrain from executing the transaction based upon the responses indicating that less than a threshold number of nodes within the set of nodes accepted the proposal.

6. The method of claim 1, comprising: executing the transaction based upon the multi-phase voting procedure indicating that a threshold number of nodes within the set of nodes accepted the proposal, wherein the identifier is added into the list of locked identifiers.

7. The method of claim 6, comprising:
removing the identifier from the list of locked identifiers based upon the transaction completing.

8. A non-transitory machine readable medium comprising instructions for performing a method, which when executed by a machine, causes the machine to:

store a distributed logical unit across nodes of a computing environment, wherein the distributed logical unit comprises a plurality of logical sub-units and is exposed as a single entity to host devices;

receive a proposal to execute a transaction to modify a first logical sub-unit of the distributed logical unit from a requestor node, wherein the proposal comprises an identifier of the first logical sub-unit that will be modified;

maintain a list of locked identifiers corresponding to identifiers of logical sub-units of the plurality of logical sub-units of the distributed logical unit that are locked and are targeted for modification by pending transactions, wherein a locked identifier with in the list of locked identifiers indicates that a corresponding logical sub-unit is locked, by a pending transaction that is to modify the logical sub-unit, from being modified by other transactions;

compare the identifier to the list of locked identifiers to determine whether the identifier occurs within the list of locked identifiers;

in response to the identifier occurring within the list of locked identifiers, transmit a busy indicator to the requestor node and queuing the proposal within a queue for a retry time period; and in response to the identifier not occurring within the list of locked identifiers, execute a multi-phase voting procedure amongst a set of nodes that are members of a group associated with the identifier, wherein the execute comprises receive responses from the nodes within the set of nodes within the group, wherein a response indicates whether a node within the set of nodes accepts the proposal for execution of the transaction.

9. The non-transitory machine readable medium of claim 8, wherein the instructions cause the machine to: execute the transaction based upon the responses indicating that the nodes within the set of nodes unanimously accepted the proposal.

10. The non-transitory machine readable medium of claim 8, wherein the instructions cause the machine to: discard the proposal to refrain from executing the transaction based upon the responses indicating that less than a threshold number of nodes within the set of nodes accepted the proposal.

11. A computing device comprising: a memory comprising machine executable code having stored thereon instructions for performing a method; and a processor coupled to the memory, the processor configured to execute the machine executable code to cause the processor to:

store a distributed logical unit across nodes of a computing environment, wherein the distributed logical unit comprises a plurality of logical sub-units and is exposed as a single entity to host devices;

receive a proposal to execute a transaction to modify a first logical sub-unit of the distributed logical unit from a requestor node, wherein the proposal comprises an identifier of the first logical sub-unit that will be modified;

maintain a list of locked identifiers corresponding to identifiers of logical sub-units of the plurality of logical sub-units of the distributed logical unit that are locked and are targeted for modification by pending transactions, wherein a locked identifier with in the list of locked identifiers indicates that a corresponding logical sub-unit is locked, by a pending transaction that is to modify the logical sub-unit, from being modified by other transactions;

compare the identifier to the list of locked identifiers to determine whether the identifier occurs within the list of locked identifiers;

in response to the identifier occurring within the list of locked identifiers, transmit a busy indicator to the requestor node and queuing the proposal within a queue for a retry time period; and in response to the identifier not occurring within the list of locked identifiers, execute a multi-phase voting procedure amongst a set of nodes that are members of a group associated with the identifier, wherein the execute comprises receive responses from the nodes within the set of nodes within the group, wherein a response indicates whether a node within the set of nodes accepts the proposal for execution of the transaction.

12. The computing device of claim 11, wherein the machine executable code causes the processor to: execute the transaction based upon the responses indicating that greater than a threshold number of nodes within the set of nodes accepted the proposal.

13. The computing device of claim 11 wherein the machine executable code causes the processor to: discard the proposal to refrain from executing the transaction based upon the responses indicating that less than a threshold number of nodes within the set of nodes accepted the proposal.

14. The computing device of claim 11 wherein the machine executable code causes the processor to: execute the transaction based upon the multi-phase voting procedure indicating that a threshold number of nodes within the set of nodes accepted the proposal.

* * * * *